United States Patent
Nimura et al.

(10) Patent No.: US 11,061,270 B2
(45) Date of Patent: Jul. 13, 2021

(54) DECORATIVE FILM

(71) Applicant: FUJIFILM Corporation, Tokyo (JP)

(72) Inventors: Shigeaki Nimura, Kanagawa (JP); Hiroshi Inada, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/533,763

(22) Filed: Aug. 6, 2019

(65) Prior Publication Data

US 2019/0361160 A1 Nov. 28, 2019

Related U.S. Application Data

(63) Continuation of application No. PCT/JP2018/000635, filed on Jan. 12, 2018.

(30) Foreign Application Priority Data

Feb. 8, 2017 (JP) .............................. JP2017-021421

(51) Int. Cl.
*G02F 1/1335* (2006.01)
*G02B 5/30* (2006.01)
*G02F 1/13363* (2006.01)

(52) U.S. Cl.
CPC ..... *G02F 1/133528* (2013.01); *G02B 5/3016* (2013.01); *G02F 1/13363* (2013.01); *G02F 1/133541* (2021.01)

(58) Field of Classification Search
CPC ........... G02F 1/133528; G02F 1/13363; G02F 2001/133541; G02B 5/3016
See application file for complete search history.

(56) References Cited

U.S. PATENT DOCUMENTS

| 2003/0133098 A1 | 7/2003 | Hoshino et al. |
| 2006/0097514 A1 | 5/2006 | Nishimura et al. |
| (Continued) | | |

FOREIGN PATENT DOCUMENTS

| JP | 2002127647 | 5/2002 |
| JP | 2005022292 | 1/2005 |
| (Continued) | | |

OTHER PUBLICATIONS

"International Search Report (Form PCT/ISA/210) of PCT/JP2018/000635," dated Apr. 10, 2018, with English translation thereof, pp. 1-4.

(Continued)

Primary Examiner — Dung T Nguyen
(74) Attorney, Agent, or Firm — JCIPRNET

(57) ABSTRACT

To provide a decorative film capable of applying a visual effect of making a pattern not visually recognizable, in a case where it is seen from the front, and making it visually recognizable, in a case where it is obliquely seen.

a circular polarization plate including a linear polarization plate, and a laminate of a uniaxial retardation layer or a biaxial retardation layer; and a circularly polarized light reflection layer which reflects circularly polarized light having a revolution direction opposite to that of light transmitted through the circular polarization plate in a vertical direction from the linear polarization plate side are included.

12 Claims, 5 Drawing Sheets

(56) References Cited

U.S. PATENT DOCUMENTS

| | | | | |
|---|---|---|---|---|
| 2009/0161044 A1* | 6/2009 | Ge | ................... | G02F 1/133555 |
| | | | | 349/98 |
| 2014/0168579 A1* | 6/2014 | Kim | ....................... | G02B 1/14 |
| | | | | 349/96 |
| 2014/0368771 A1* | 12/2014 | Sakai | ............... | G02F 1/133528 |
| | | | | 349/98 |
| 2019/0155082 A1* | 5/2019 | Sakai | ............... | G02F 1/133528 |
| 2019/0353956 A1* | 11/2019 | Yanai | ..................... | H05B 33/02 |

FOREIGN PATENT DOCUMENTS

| | | |
|---|---|---|
| JP | 2005096178 | 4/2005 |
| JP | 2009300662 | 12/2009 |
| JP | 5347442 | 11/2013 |
| JP | 2014076583 | 5/2014 |

OTHER PUBLICATIONS

"Written Opinion of the International Searching Authority (Form PCT/ISA/237) of PCT/JP2018/000635," dated Apr. 10, 2018, with English translation thereof, pp. 1-7.

* cited by examiner

DECORATIVE FILM

CROSS-REFERENCE TO RELATED APPLICATIONS

This application is a Continuation of PCT International Application No. PCT/JP2018/000635 filed on Jan. 12, 2018, which claims priority under 35 U.S.C. § 119(a) to Japanese Patent Application No. 2017-021421 filed on Feb. 8, 2017. The above application is hereby expressly incorporated by reference, in its entirety, into the present application.

BACKGROUND OF THE INVENTION

1. Field of the Invention

The present invention relates to a decorative film.

2. Description of the Related Art

A layer including a cholesteric liquid crystalline phase (cholesteric liquid crystalline layer) is known as a layer having properties of selectively reflecting any one of right circularly polarized light or left circularly polarized light in a specific wavelength range. Accordingly, the cholesteric liquid crystalline layer is developed for various uses, and for example, applied for a display device for displaying images having partially different color tones (JP2009-300662A).

JP2005-096178A discloses that cholesteric liquid crystalline layers are used in a medium for genuineness determination, and discloses that, by irradiating the medium for genuineness determination with right circularly polarized light or left circularly polarized light, both cholesteric liquid crystalline layers have reflectivity, and are colored to be clearer or are not visually recognized at all.

SUMMARY OF THE INVENTION

However, in recent years, a decorative film which cannot be visually recognized, in a case where it is seen from the front, but can be visually recognized, in a case where it is obliquely seen is required.

For example, in a case where a dashboard of a vehicle is in a color other than black or has a multicolor pattern, a driver's view may be blocked due to reflected glare on a window screen. The dashboard is in black in many cases, in order to prevent such reflected glare on the window screen. With respect to this, it is desired to improve design by setting the color of the dashboard as a color other than black or by applying a multicolor pattern thereto, while preventing the reflected glare on the window screen.

The present invention is made in consideration of these circumstances and an object thereof is to provide a decorative film capable of applying a visual effect of making a pattern not visually recognizable, in a case where it is seen from the front, and making it visually recognizable, in a case where it is obliquely seen.

As a result of intensive studies for the problem of the technology of the related art, the inventors have found that the problem can be solved, by including a circular polarization plate including a linear polarization plate and a laminate of a uniaxial retardation layer or a biaxial retardation layer, and a circularly polarized light reflection layer which reflects circularly polarized light having a revolution direction opposite to that of light transmitted through the circular polarization plate in a vertical direction from the linear polarization plate side.

That is, the inventors have found that the object described above can be achieved with the following configurations.

(1) A decorative film including: a circular polarization plate including a linear polarization plate, and a laminate of a uniaxial retardation layer or a biaxial retardation layer; and a circularly polarized light reflection layer which reflects circularly polarized light having a revolution direction opposite to that of light transmitted through the circular polarization plate in a vertical direction from the linear polarization plate side.

(2) The decorative film according to (1), in which the laminate of the uniaxial retardation layer includes a uniaxial λ/4 plate and a C-plate.

(3) The decorative film according to (2), in which a retardation absolute value of the C-plate in a thickness direction is 250 nm to 1,500 nm.

(4) The decorative film according to (1), in which the biaxial retardation layer is formed of a biaxial λ/4 plate.

(5) The decorative film according to (4), in which an Nz factor of the biaxial λ/4 plate is equal to or greater than 3.

(6) The decorative film according to any one of (1) to (5), in which the circularly polarized light reflection layer is a cholesteric liquid crystalline layer.

(7) The decorative film according to any one of (1) to (6), in which the circularly polarized light reflection layer includes two or more reflection regions having different selective reflection wavelengths.

(8) The decorative film according to any one of (1) to (7), in which a plurality of the circularly polarized light reflection layers are provided.

(9) The decorative film according to (8), further comprising: a C-plate between the plurality of circularly polarized light reflection layers.

(10) The decorative film according to any one of (1) to (9), further comprising: a second circularly polarized light reflection layer on a side closer to an outermost surface on the linear polarization plate side than the laminate of the uniaxial retardation layer or the biaxial retardation layer.

(11) The decorative film according to (10), in which the second circularly polarized light reflection layer includes two or more reflection regions having different selective reflection wavelengths.

(12) The decorative film according to any one of (1) to (11), further comprising: a colored layer on a surface of the circularly polarized light reflection layer on a side opposite to the surface on the circular polarization plate side.

(13) The decorative film according to any one of (1) to (12), further comprising: an antireflection layer on an outermost surface layer on the linear polarization plate side.

According to the present invention, it is possible to provide a decorative film capable of applying a visual effect of making a pattern not visually recognizable, in a case where it is seen from the front, and making it visually recognizable, in a case where it is obliquely seen.

DESCRIPTION OF THE PREFERRED EMBODIMENTS

Figure 1:
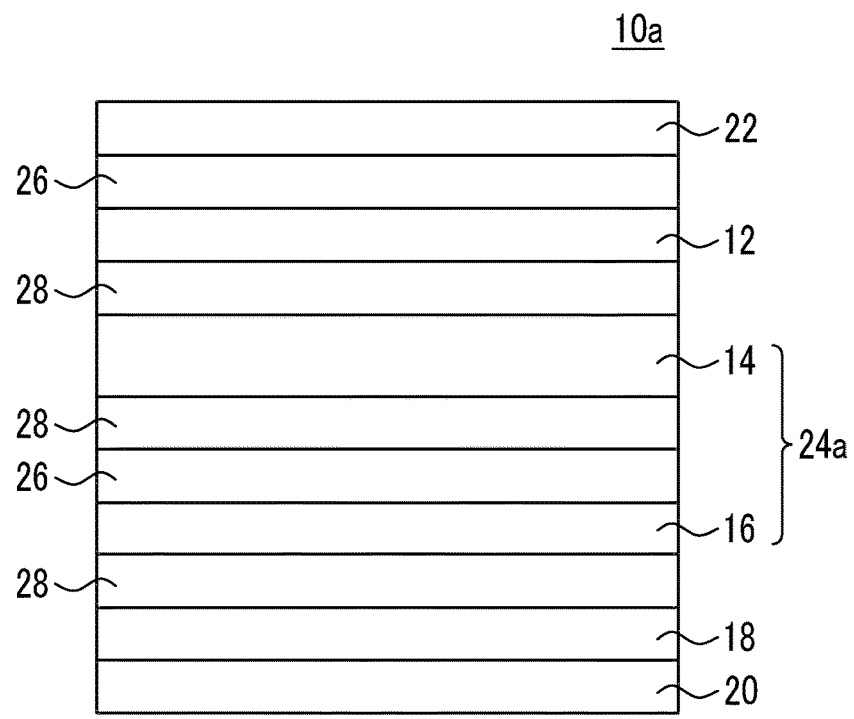
FIG. 1 is a cross section view schematically showing an example of a decorative film according to the embodiment of the present invention.

Hereinafter, a decorative film according to the embodiment of the present invention will be described in detail. A range of numerical values shown using "to" in the present specification means a range including numerical values before and after "to" as a lower limit value and an upper limit value.

In addition, in the present specification, "vertical" and "parallel" include a range of errors allowed in the technical field of the present invention. For example, "vertical" and "parallel" means a range of less than ±10° with respect to the exact vertical or parallel state, and the error with respect to the exact vertical or parallel state is preferably equal to or smaller than 5° and more preferably equal to or smaller than 3°.

In addition, an angle with an expression other than "vertical" and "parallel", for example, a specific angle such as 15° or 45° also include a range of errors allowed in the technical field of the present invention. For example, in the present invention, the angle means an angle less than ±5° of the specifically shown exact angle, and the error of the specifically shown exact angle is preferably equal to or smaller than ±3° and preferably equal to or smaller than ±1°.

In the present specification, "(meth)acrylate" is used as meaning of "one or both of acrylate and methacrylate".

In the present specification, the "same" includes a range of errors generally allowed in the technical field. In addition, in the present specification, the expression "entire portion", "all of", or "entire surface" not only means a percentage of 100%, but also includes a range of errors generally allowed in the technical field, and a percentage thereof may be, for example, equal to or greater than 99%, equal to or greater than 95%, or equal to or greater than 90%.

Visible light is light having wavelengths which are visually recognizable by a person among electromagnetic waves and indicates light in a wavelength range of 380 nm to 780 nm. Invisible light is light in a wavelength range less than 380 nm or a wavelength range exceeding 780 nm.

Although it is not limited to this, in the visible light, light in a wavelength range of 420 nm to 490 nm is blue light, light in a wavelength range of 495 nm to 570 nm is green light, and light in a wavelength range of 620 nm to 750 nm is red light.

In infrared light, near infrared light is electromagnetic waves in a wavelength range of 780 nm to 2,500 nm. Ultraviolet light is light in a wavelength range of 10 to 380 nm.

In this specification, the selective reflection wavelength is an average value of two wavelengths showing half value transmittance: T½(%) shown with the following equation, in a case where a minimum value of transmittance of a target product (member) is set as Tmin (%).

$T\frac{1}{2}=100-(100-Tmin)/2$ Equation for acquiring half value transmittance:

In the present specification, the "haze" means a value measured with a haze meter NDH-2000 manufactured by Nippon Denshoku Industries Co., Ltd.
The haze theoretically means a value represented by the following expression.

(scattering transmittance of natural light at 380 to 780 nm)/(scattering transmittance of natural light at 380 to 780 nm+straight transmittance of natural light)×100%

A scattering transmittance is a value which can be calculated by subtracting a straight transmittance from the obtained omnidirectional transmittance by using a spectrophotometer and an integrating sphere unit. The straight transmittance is a transmittance at 0°, based on a value measured by using the integrating sphere unit. That is, a low haze means a great quantity of linearly transmitted light among the total quantity of transmitted light.

A refractive index is a refractive index with respect to light at a wavelength of 589.3 nm.

In the present specification, Re (λ) and Rth (λ) respectively represent a retardation in plane at a wavelength λ and a retardation in a thickness direction. Unless otherwise noted, the wavelength λ is 550 nm.

In the present specification, Re (λ) and Rth (λ) are values measured at a wavelength λ using AxoScan OPMF-1 (manufactured by Opto Science, Inc.). By inputting an average refractive index ((Nx+Ny+Nz)/3) and a film thickness (d (μm)) into AxoScan, slow axis direction (°)

$Re(\lambda)=R0(\lambda)$ $Rth(\lambda)=((Nx+Ny)/2-Nz)\times d$ are calculated.

R0(λ) is displayed as a numerical value calculated by AxoScan, and means Re(λ).

In the present specification, the refractive indexes Nx, Ny, and Nz are measured by using an Abbe refractometer (NAR-4T, manufactured by Atago Co., Ltd., and a sodium lamp (λ=589 nm) as a light source. In a case of measuring a wavelength dependency, the wavelength dependency can be measured by using a multiwavelength Abbe refractometer DR-M2 (manufactured by Atago Co., Ltd.) in combination with a dichroic filter.

In addition, values of Polymer Handbook (JOHN WILEY&SONS, INC.) and catalogues of various optical films can also be used. Values of the average refractive indexes of main optical films are shown as follows; cellulose acylate (1.48), cycloolefin polymer (1.52), polycarbonate (1.59), polymethyl methacrylate (1.49), polystyrene (1.59)

The decorative film according to the embodiment of the present invention is a decorative film including: a circular polarization plate including a linear polarization plate, and a laminate of a uniaxial retardation layer or a biaxial retardation layer; and a circularly polarized light reflection layer which reflects circularly polarized light having a revolution direction opposite to that of light transmitted through the circular polarization plate in a vertical direction from the linear polarization plate side.

[Decorative Film]

Hereinafter, an example of the preferred embodiment of the decorative film according to the embodiment of the present invention will be described with reference to the drawings.

FIG. 1 shows a schematic cross section view of an example of the decorative film according to the embodiment of the present invention.

The drawing of the present invention is a schematic view and a relationship between thicknesses, a positional relationship, and the like of layers do not necessarily correspond to actual figures. The same applies to the drawings hereinafter.

As shown in FIG. 1, a decorative film 10a includes an antireflection layer 22, a linear polarization plate 12, a uniaxial λ/4 plate 14, a C-plate 16, a circularly polarized light reflection layer 18, and a colored layer 20 in this order.

As shown in FIG. 1, a support 26 and a pressure sensitive adhesive layer 28 are suitably laminated between each layer of the decorative film 10a. In addition, various other functional layers may be provided between each layer.

Here, the uniaxial λ/4 plate 14 and the C-plate 16 configure a laminate 24a of the uniaxial retardation layer of the present invention.

Figure 2:
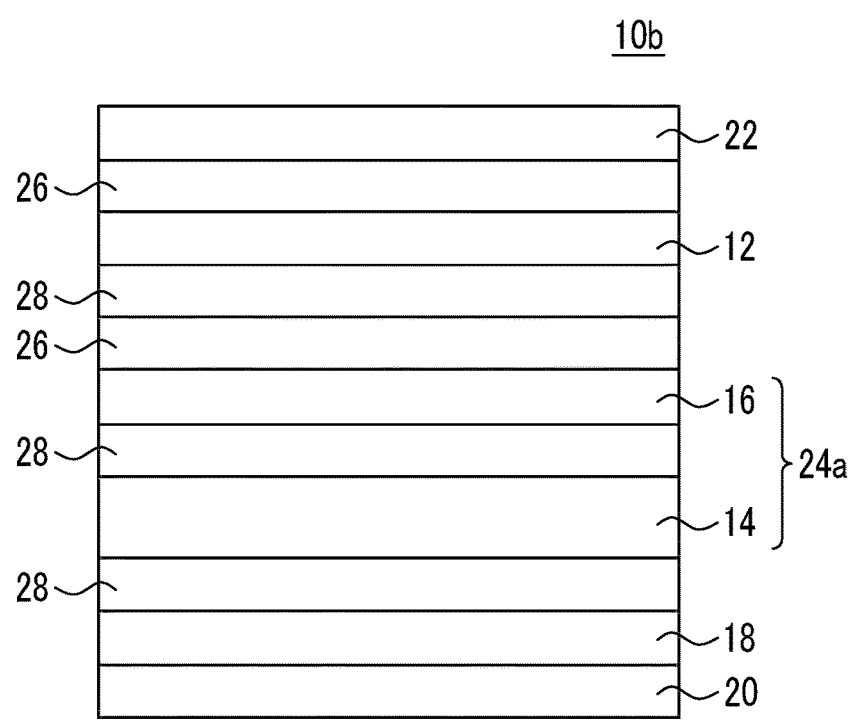
FIG. 2 is a cross section view schematically showing another example of the decorative film according to the embodiment of the present invention.

In the example shown in FIG. 1, the laminate 24a of the uniaxial retardation layer has a configuration in which the uniaxial λ/4 plate 14 and the C-plate 16 are laminated in this order from the linear polarization plate 12 side. However, as shown in FIG. 2, the laminate 24a of the uniaxial retardation layer may have a configuration in which the C-plate 16 and the uniaxial λ/4 plate 14 are laminated in this order from the linear polarization plate 12 side.

(Linear Polarization Plate)

The linear polarization plate 12 has a polarization axis in one direction and a function of transmitting specific linearly polarized light.

As the linear polarization plate 12, a typical linear polarization plate such as an absorption type polarization plate including an iodine compound and a reflection type polarization plate such as wire grid can be used. The polarization axis is identical to a transmission axis.

As the absorption type polarization plate, for example, any of an iodine-based polarization plate, a dye-based polarization plate using a dichroic dye, and a polyene-based polarization plate can be used. The iodine-based polarization plate and the dye-based polarization plate are generally manufactured by causing iodine or a dichroic dye to be adsorbed to polyvinyl alcohol and stretched.

Here, a combination of the linear polarization plate 12 and the laminate 24a of the uniaxial retardation layer functions as a circular polarization plate which transmits a specific linearly polarized light component in light incident from the linear polarization plate 12 side, as circularly polarized light. That is, a combination of the linear polarization plate 12 and the laminate 24a of the uniaxial retardation layer is a circular polarization plate of the present invention and transmits linearly polarized light having a revolution direction opposite to a revolution direction of the circularly polarized light reflected by the circularly polarized light reflection layer 18.

(Uniaxial λ/4 Plate)

The uniaxial λ/4 plate (hereinafter, also simply referred to as a "λ/4 plate") 14 is a well-known λ/4 plate of the related art, and emits circularly polarized light, in a case where light incident to the λ/4 plate is linearly polarized light, and emits linearly polarized light, in a case where light incident to the λ/4 plate is circularly polarized light.

Here, the uniaxial λ/4 plate is a λ/4 plate satisfying a relationship of nx>ny≈nz or nx<ny≈nz.

The λ/4 plate (plate having a λ/4 function) is a plate having a function of converting linearly polarized light at a specific wavelength to circularly polarized light, or circularly polarized light to linearly polarized light. More specifically, the λ/4 plate is a plate in which an in-plane retardation value at a predetermined wavelength λ nm shows Re(λ)=λ/4 (or off times thereof). This expression may be achieved at any wavelength (for example, 550 nm) of visible light range.

The λ/4 plate may have a configuration formed of only an optically anisotropic layer having a λ/4 function or may have a configuration formed with an optically anisotropic layer having a λ/4 function on a support, and in a case where the λ/4 plate includes a support, a combination of the support and the optically anisotropic layer means the λ/4 plate.

As the λ/4 plate, a well-known λ/4 plate can be used.

Here, the λ/4 plate 14 is disposed in a slow axis so as to convert the incident linearly polarized light transmitted through the linear polarization plate 12 to circularly polarized light.

(C-Plate)

The C-plate is a well-known C-plate of the related art and is a retardation member having a polarization axis in a thickness direction.

The C-plate has two types of a positive C-plate and a negative C-plate, the positive C-plate satisfies a relationship of Expression (C1), and the negative C-plate satisfies a relationship of Expression (C2). In the positive C-plate, Rth shows a negative value, and in the negative C-plate, Rth shows a positive value.

nz>nx≈ny     Expression (C1)

nz<nx≈ny     Expression (C2)

The symbol "≈" not only means that both values are completely the same, but also means that both values are substantially the same. The expression "substantially the same" is included in "nx ny", also in a case where (nx−ny)×d (here, d is a thickness of a film) is 0 to 10 nm and preferably 0 to 5 nm, for example.

As the positive C-plate, a well-known positive C-plate can be suitably used. In the same manner, as the negative C-plate, a well-known negative C-plate can be suitably used.

Since the C-plate has a polarization axis in a thickness direction, the C-plate transmits light incident to the C-plate in a vertical direction, without applying a retardation to two polarization components thereof. On the other hand, a retardation can be applied to two polarization components of light incident to the C-plate in an oblique direction.

Here, as described above, a combination of the uniaxial λ/4 plate 14 having a retardation in a plane direction and the C-plate having a retardation in a thickness direction is a laminate of the uniaxial retardation layer, and is a laminate in which two kinds of uniaxial retardation layers having retardations in directions different from each other are laminated.

(Circularly Polarized Light Reflection Layer)

The circularly polarized light reflection layer 18 reflects circularly polarized light having a revolution direction opposite to a revolution direction of light transmitted through the circular polarization plate including the linear polarization plate 12, the λ/4 plate 14, the C-plate 16 from the linear polarization plate side in a vertical direction, and transmits other circularly polarized light.

That is, in a case where light transmitted through the circular polarization plate in a vertical direction is right circularly polarized light, the circularly polarized light reflection layer transmits right circularly polarized light and reflects left circularly polarized light, and in a case where light transmitted through the circular polarization plate in a vertical direction is left circularly polarized light, the circularly polarized light reflection layer transmits left circularly polarized light and reflects right circularly polarized light.

As the circularly polarized light reflection layer 18, a cholesteric liquid crystalline layer can be used.

<Cholesteric Liquid Crystalline Layer>

The cholesteric liquid crystalline layer includes a cholesteric liquid crystalline phase and has a wavelength selective reflectivity with respect to circularly polarized light having a predetermined revolution direction in a specific wavelength range.

A selective reflection wavelength λ of the cholesteric liquid crystalline phase depends on a pitch P (=period of helix) of a helical structure of the cholesteric liquid crystalline phase and is in a relationship of an average refractive index of the cholesteric liquid crystalline phase and λ=n×P. Accordingly, the selective reflection wavelength can be adjusted by adjusting the pitch of the helical structure. The pitch of the cholesteric liquid crystalline phase depends on the kind of a chiral agent used with a polymerizable liquid crystal compound or an added concentration thereof, and thus, a desired pitch can be obtained by adjusting these.

A half-width Δλ (nm) of the selective reflection range (circular polarization reflection region) showing the selective reflection depends on a refractive index anisotropy Δn of the cholesteric liquid crystalline phase and a pitch P of the helix, and is in a relationship of Δλ=Δn×P. Accordingly, a width of the selective reflection range can be controlled by adjusting Δn. Δn can be adjusted in accordance with the kind of the liquid crystal compound forming the reflection region, a mixing ratio thereof, and a temperature during the alignment. It is known that a reflectivity of the cholesteric liquid crystalline phase depends on Δn, and in a case of obtaining the same degree of the reflectivity, as Δn increases, the number of helical pitches decreases, that is, a film thickness can be decreased.

As a measuring method of the sense or pitch of the helix, methods disclosed in "Introduction: Liquid Crystal Experiments" (edited by the Japanese Liquid Crystal. Society, Sigma Publications, published in 2007 p. 46) and "Liquid Crystal Handbook" (Liquid Crystal Handbook Editorial Committee, Maruzen Publishing, p. 196) can be used.

The reflected light of the cholesteric liquid crystalline phase is circularly polarized light. The fact whether or not the reflected light is right circularly polarized light or left circularly polarized light depends on a twisted direction of the helix of the cholesteric liquid crystalline phase. Regarding the selective reflection of the circularly polarized light due to the cholesteric liquid crystalline phase, in a case where the twisted direction of the helix of the cholesteric liquid crystalline phase is right, the right circularly polarized light is reflected, and in a case where the twisted direction of the helix is left, the left circularly polarized light is reflected.

A direction of revolution of the cholesteric liquid crystalline phase can be adjusted in accordance with the kinds of a liquid crystal compound forming the reflection region or the kinds of a chiral agent to be added.

The cholesteric liquid crystalline layer may be formed of 1 layer and may have a multilayer configuration.

The widening of the wavelength range of reflected light can be realized by laminating layers having the shifted selective reflection wavelength λ in order. In addition, a technology of widening the wavelength range by a method of changing the helical pitch in the layer stepwise which is called a pitch gradient method has been known, and examples thereof include methods disclosed in Nature 378, 467-469 (1995), JP1994-281814A (JP-H06-281814A), and JP4990426B.

In the present invention, the selective reflection wavelength of the cholesteric liquid crystalline layer can be set in any range of visible light (approximately 380 to 780 nm) and near infrared light (approximately 780 to 2,000 nm) and the setting method thereof is as described above.

(Colored Layer)

The colored layer 20 is disposed on a surface side of the circularly polarized light reflection layer 18 on a side opposite to the surface on the C-plate 16 (laminate 24*a* of the uniaxial retardation layer) side, and controls the reflection by absorbing light transmitted through the circularly polarized light reflection layer.

The colored layer 20 is preferably in black, that is, preferably absorbs light in the entire range of visible light, but there is no limitation thereto, and the colored layer may have a color other than black.

As the colored layer 20, various well-known colored layers of the related art used in an optical film can be used. For example, a black ink can be applied to a rear surface of the circularly polarized light reflection layer 18 to obtain the colored layer 20. Alternatively, a black ink can also be applied to a front surface of a base material film to obtain the colored layer 20.

(Antireflection Layer)

The antireflection layer 22 is laminated on the outermost surface of the decorative film 10*a* on the linear polarization plate 12 side, and prevents the reflection at an interface of the decorative film 10*a* and the outside.

As the antireflection layer, various well-known antireflection layer of the related art used in an optical film can be used.

For example, in addition to a film formed with fine surface ruggedness, a film having a configuration of a two-layered film with a combination of a high refractive index layer and a low refractive index layer, a film having a configuration of a three-layered film in which an intermediate refractive index layer, a high refractive index layer, and a low refractive index layer are laminated in this order, and the like are used.

As a configuration example, a film of two layers of a high refractive index layer/low refractive index layer in the order from the lower side, or a film in which three layers having different refractive indexes are laminated in the order of intermediate refractive index layer (layer having a refractive index higher than the underlayer and having a refractive index lower than that of a high refractive index)/high refractive index layer/low refractive index layer is used, and a film in which even more antireflection layers are laminated is also proposed. Among these, from viewpoints of durability, optical properties, cost, productivity, and the like, it is preferable to provide intermediate refractive index layer/high refractive index layer/low refractive index layer on a hard coat layer, and examples thereof include configurations disclosed in JP1996-122504A (JP-H08-122504A), JP1996-110401A (JP-H08-110401A), JP1998-300902A (JP-H10-300902A), JP2002-243906A, and JP2000-111706A. In addition, an antireflection layer having a three-layered configuration having excellent robustness with respect to film thickness variation is disclosed in JP2008-262187A. Furthermore, other functions may be applied to each other, and for example, a low refractive index layer having antifouling properties, a high refractive index layer having antistatic properties, a hard coat layer having antistatic properties, a hard coat layer having anti-glare characteristics, and the like (for example, JP1998-206603A (JP-H10-206603A), JP2002-243906A, JP2007-264113A) are used.

Examples of inorganic material configuring the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$, and these can be used alone or in combination of two or more kinds thereof. Among these, $SiO_2$, $ZrO_2$, $TiO_2$, and $Ta_2O_5$ are preferable, because vacuum deposition can be performed at a low temperature and a film can also be formed on a surface of a plastic substrate.

As a multilayer film formed with the inorganic material, a laminated structure in which a high refractive index material layer and a low refractive index material layer are alternately formed from the substrate side, in which a total optical film thickness of a $ZrO_2$ layer and a $SiO_2$ layer is λ/4, an optical film thickness of the $ZrO_2$ layer is λ/4, and an optical film thickness of the $SiO_2$ layer on the outermost surface layer is λ/4, is exemplified. Here, λ is a design wavelength and a wavelength at 520 nm is generally used. The outermost surface layer is preferably formed of $SiO_2$, because a refractive index is low and a mechanical strength can be applied to the antireflection layer.

In a case where the antireflection layer is formed with the inorganic material, as a film forming method, a vacuum deposition method, an ion plating method, a sputtering method, a CVD method, a method of precipitating due to a chemical reaction in a saturated solution can be used, for example.

Examples of an organic material used in the low refractive index layer include a tetrafluoroethylene-hexafluoropropylene copolymer (FFP), polytetrafluoroethylene (PTFE), and an ethylene-tetrafluoroethylene copolymer (ETFE), and a composition including a fluorine-containing curable resin and inorganic fine particles disclosed in JP2007-298974A or a hollow silica fine particles-containing low refractive index coating composition disclosed in JP2002-317152A, JP2003-202406A, AND JP2003-292831A can be suitably used. The film can be formed by a coating method having excellent productivity such as a spin coating method, a dip coating method, a gravure coating method, in addition to the vacuum deposition method, as the film coating method.

A refractive index of the low refractive index layer is preferably 1.30 to 1.51. The refractive index is preferably 1.30 to 1.46 and more preferably 1.32 to 1.38.

As an organic material used in the intermediate refractive index layer and the high refractive index layer, a binder obtained by crosslinking or a polymerization reaction such as an ionizing radiation curable compound including an aromatic ring, an ionizing radiation curable compound including a halogenated element other than fluorine (for example, Br, I, or Cl), and an ionizing radiation curable compound including atoms such as S, N, or P, and inorganic particles using $TiO_2$ added thereto as a main component can be used. Specifically, a description disclosed in paragraphs [0074] to [0094] of JP2008-262187A can be exemplified.

A refractive index of the high refractive index layer is preferably 1.65 to 2.20 and more preferably 1.70 to 1.80. A refractive index of the intermediate refractive index layer is adjusted to be a value between the refractive index of the low refractive index layer and the refractive index of the high refractive index layer. The refractive index of the intermediate refractive index layer is preferably 1.55 to 1.65 and more preferably 1.58 to 1.63.

A film thickness of the antireflection layer is not particularly limited and is preferably 0.1 to 10 μm, more preferably 1 to 5 μm, and particularly preferably 2 to 4 μm.

A specular reflectivity of visible light of the antireflection layer as a single body is preferably equal to or smaller than 5% and more preferably equal to or smaller than 3%.

The specular reflectivity is obtained by measuring a specular spectral reflectance of a front surface side at an incidence angle of 5° in a wavelength range of 380 to 780 nm using a spectrophotometer (manufactured by JASCO Corporation), in a state where a rear surface of the antireflection layer single body (antireflection film) is roughened with sand paper and treated with a black ink to eliminate the rear surface reflection. As a result, an arithmetic mean value of the specular reflectivity of 450 to 650 nm was used.

(Support)

The support 26 is disposed, if necessary, in order to support any layer configuring the decorative film.

In the example shown in FIG. 1, the support 26 which supports the linear polarization plate 12 on one surface and supports the antireflection layer 22 on the other surface, and the support 26 which support the C-plate are provided.

The support is not limited, as long as it has transparency and is a sheet-shaped material having supporting properties, and various well-known supports used in an optical film can be used. For example, as the support, a PET film, a TAC film, or an acryl-based resin film is used.

A thickness of the support is not particularly limited, and is preferably 20 μm to 200 μm and more preferably 30 μm to 150 μm, from viewpoints of transparency and supporting properties.

(Pressure Sensitive Adhesive Layer)

The pressure sensitive adhesive layer 28 is disposed, if necessary, between each layer configuring the decorative film to bond the layers to each other.

In the example shown in FIG. 1, the pressure sensitive adhesive layer is disposed between the linear polarization plate 12 and λ/4 plate 14, between the λ/4 plate 14 and the support 26, and the C-plate 16 and circularly polarized light reflection layer 18.

As the pressure sensitive adhesive layer 28, any layer formed of various well-known materials can be used, as long as it is a material which can bond target layers (sheet-shaped material) to each other, and the pressure sensitive adhesive layer may be a layer formed of an adhesive which has fluidity during the bonding and then becomes a solid, may be a layer formed of a pressure sensitive adhesive which is gelatinous (rubber state) flexible solid during the bonding and the gelatinous state thereof does not change thereafter, or may be a layer formed of a material having both properties of the adhesive and the pressure sensitive adhesive. Accordingly, as the pressure sensitive adhesive layer 28, a well-known material used for bonding sheet-shaped materials such as an optical clear adhesive (OCA), an optical clear double sided tape, or an ultraviolet curable resin may be used.

Figure 3:
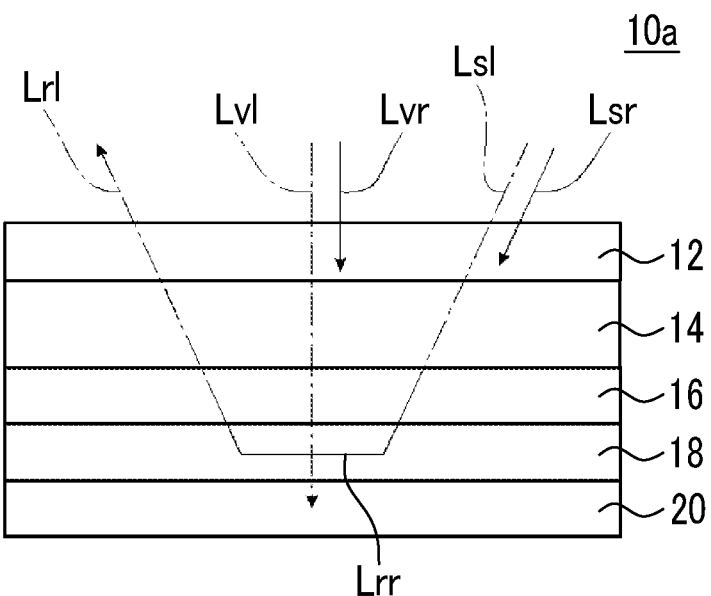
FIG. 3 is a schematic cross section view for describing an operation of the decorative film shown in FIG. 1.

Next, the operation of the decorative film 10a configured as described above will be described with reference to FIG. 3. In FIG. 3, the antireflection layer 22, the support 26, and the pressure sensitive adhesive layer 28 are not shown.

In the description hereinafter, the circular polarization plate formed of the linear polarization plate 12 and the laminate 24a of the uniaxial retardation layer converts a specific linearly polarized light component of incident light to left circularly polarized light and transmits the left circularly polarized light, and the circularly polarized light reflection layer 18 reflects the right circularly polarized light.

As shown in FIG. 3, among light components (Lvr and Lvl) vertically incident to the decorative film 10a from the linear polarization plate 12 side, a linearly polarized light component Lvr in a direction different from a polarization axis (transmission axis) of the linear polarization plate 12 is absorbed to the linear polarization plate 12. Meanwhile, a linearly polarized light component Lvl in the same direction as the polarization axis of the linear polarization plate 12 is incident to the uniaxial λ/4 plate 14.

The linearly polarized light component Lvl incident to the uniaxial λ/4 plate 14 is converted to left circularly polarized light Lvl and incident to the C-plate 16.

The left circularly polarized light Lvl incident to the C-plate 16 is vertically incident, and accordingly, the left circularly polarized light is transmitted as it is and incident to the circularly polarized light reflection layer 18.

That is, the circular polarization plate including the linear polarization plate 12, the uniaxial λ/4 plate 14, and the C-plate converts the light incident in a vertical direction to left circularly polarized light and emits the left circularly polarized light.

The circularly polarized light reflection layer 18 reflects right circularly polarized light and transmits left circularly polarized light, and accordingly, the incident left circularly polarized light Lvl transmitted through the C-plate 16 is transmitted through the circularly polarized light reflection layer 18 and incident to the colored layer 20.

The left circularly polarized light Lvl incident to the colored layer 20 is absorbed by the colored layer 20.

As described above, in a case where the light is incident to the decorative film 10a in a vertical direction, the entire component of the incident light is absorbed to the decorative film 10a and there is no reflected component. Accordingly, in a case where the decorative film 10a is seen from the front, a color other than black or a pattern is not seen.

Meanwhile, as shown in FIG. 3, among light components (Lsr and Lsl) obliquely incident to the decorative film 10a from the linear polarization plate 12 side, a linearly polarized light component Lsr in a direction different from the polarization axis (transmission axis) of the linear polarization plate 12 is absorbed to the linear polarization plate 12. Meanwhile, a linearly polarized light component Lsl in the same direction as the polarization axis of the linear polarization plate 12 is incident to the uniaxial λ/4 plate 14.

The linearly polarized light Lsl incident to the uniaxial λ/4 plate 14 is converted to the left circularly polarized light Lsl and incident to the C-plate 16.

The left circularly polarized light Lsl incident to the C-plate 16 is incident to the C-plate in an oblique direction, and accordingly, a polarization state is changed due to a retardation of the C-plate 16 in a thickness direction to a state of including the left circularly polarized light component and a right circularly polarized light component Lrr, and the light is incident to the circularly polarized light reflection layer 18.

The left circularly polarized light component incident to the circularly polarized light reflection layer 18 is transmitted through the circularly polarized light reflection layer 18, incident to the colored layer 20, and absorbed by the colored layer 20.

Meanwhile, the right circularly polarized light component Lrr incident to the circularly polarized light reflection layer 18 is reflected by the circularly polarized light reflection layer 18 and is incident to the C-plate 16 again.

The right circularly polarized light component Lrr incident to the C-plate 16 is incident to the C-plate in an oblique direction, and accordingly, a polarization state is changed due to a retardation of the C-plate 16 in a thickness direction to a state including the right circularly polarized light component Lrr and the left circularly polarized light component Lrl, and the light is incident to the λ/4 plate 14.

The right circularly polarized light component Lrr incident to the λ/4 plate 14 is converted to linearly polarized light by the λ/4 plate 14, and is absorbed to the linear polarization plate 12, because the polarization direction thereof does not coincide with a direction of the polarization axis of the linear polarization plate 12.

Meanwhile, the left circularly polarized light component Lrl incident to the λ/4 plate 14 is converted to linearly polarized light by the λ/4 plate 14, and is transmitted through the linear polarization plate 12, because the polarization direction thereof coincides with a direction of the polarization axis of the linear polarization plate 12.

As described above, in a case where the light is incident to the decorative film 10a in an oblique direction, a part of the incident light component is reflected by the decorative film 10a. In this case, the light at the selective reflection wavelength of the circularly polarized light reflection layer is reflected, and accordingly, a color according to the selective reflection wavelength of the circularly polarized light reflection layer is visually recognized. Therefore, in a case where the decorative film 10a is seen in an oblique direction, the color other than black can be visually recognized.

As described above, the decorative film 10a of the present invention can apply a visual effect of making a pattern not visually recognizable, in a case where it is seen from the front, and making it visually recognizable, in a case where it is obliquely seen.

Here, as described above, in the present invention, the C-plate 16 has a function of converting a revolution direction of circularly polarized light incident in an oblique direction, and as the converted amount of the revolution direction is great, visibility in an oblique direction can be improved. Therefore, it is preferable that the revolution direction of the circularly polarized light incident to the C-plate 16 is converted to a completely opposite revolution direction. That is, it is preferable that the C-plate functions as a λ/2 wavelength plate with respect to the circularly polarized light incident to the C-plate 16.

From the point described above, as the retardation Rth of the C-plate 16 in a thickness direction, a retardation Rth functioning as a λ/2 wavelength plate with respect to a desired angle is preferably suitably set in accordance with an angle at which the film can be visually recognized, or a selective reflection wavelength of the circularly polarized light reflection layer. Specifically, the thickness direction retardation Rth of the C-plate 16 is preferably 250 nm to 1,500 nm.

In the example shown in FIG. 1, in the vertical direction, the circular polarization plate (combination of the linear polarization plate 12, and the laminate 24a of the uniaxial retardation layer) transmits the left circularly polarized light, and the circularly polarized light reflection layer 18 reflects the right circularly polarized light, but there is no limitation thereto. The circular polarization plate (combination of the linear polarization plate 12, and the laminate 24a of the uniaxial retardation layer) may transmit right circularly polarized light and the circularly polarized light reflection layer 18 may reflect the left circularly polarized light.

In the example shown in FIG. 1, the laminate 24a of the uniaxial retardation layer formed of the uniaxial λ/4 plate 14 and the C-plate 16 is provided, but there is no limitation thereto. As shown in a decorative film 10c shown in FIG. 4, a biaxial retardation layer 24b formed of a biaxial λ/4 plate 30 may be provided. The decorative film 10c shown in FIG. 4 has the same configuration as that of the decorative film 10a shown in FIG. 1, except that the biaxial retardation layer 24b is provided, instead of the laminate 24a of the uniaxial retardation layer, and thus, the same reference numerals are used for the same constituent elements, and the description thereof is omitted.

Figure 4:
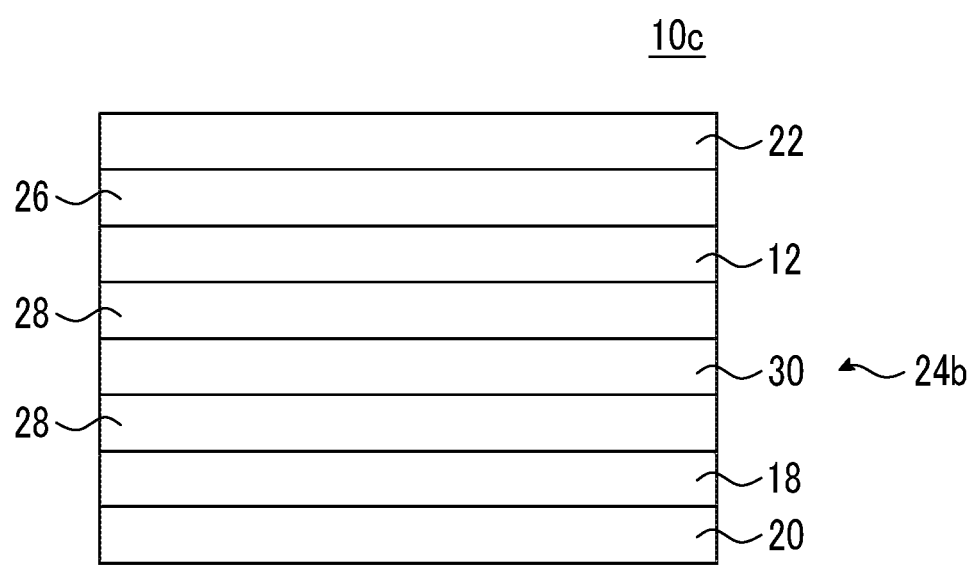
FIG. 4 is a cross section view schematically showing still another example of the decorative film according to the embodiment of the present invention.

The decorative film 10c shown in FIG. 4 includes the antireflection layer 22, the linear polarization plate 12, the biaxial λ/4 plate 30 which is the biaxial retardation layer 24b, the circularly polarized light reflection layer 18, and the colored layer 20.

(Biaxial λ/4 Plate)

The biaxial λ/4 plate 30 has birefringence properties in the in-plane direction and the thickness direction, the in-plane retardation value shows Re (λ)=λ/4, and the retardation value Rth (λ) in a thickness direction shows a predetermined value. That is, the biaxial λ/4 plate is a retardation layer satisfying a relationship of nx≠ny≠nz (relationship in which all of the refractive indexes are not substantially same).

That is, the biaxial λ/4 plate 30 has birefringence properties in the in-plane direction and the thickness direction, and accordingly, can exhibit the functions of the uniaxial λ/4 plate 14 and the C-plate 16 described above at the same time.

Therefore, as the thickness direction retardation Rth of the biaxial λ/4 plate 30, a retardation Rth functioning as a λ/2 wavelength plate with respect to a desired angle is preferably suitably set in accordance with an angle at which the film can be visually recognized, or a selective reflection wavelength of the circularly polarized light reflection layer, in the same manner as the thickness direction retardation Rth of the C-plate 16 described above. Specifically, the thickness direction retardation Rth of the biaxial λ/4 plate 30 is preferably 250 nm to 1,500 nm.

From a viewpoint of causing the biaxial λ/4 plate to function as a λ/2 wavelength plate with respect to a desired angle, an Nz factor of the biaxial λ/4 plate 30 is preferably equal to or greater than 3.

In the example shown in FIG. 1, the circularly polarized light reflection layer (cholesteric liquid crystalline layer) 18 is configured to reflect light at the same selective reflection wavelength from the entire surface thereof, but there is no limitation thereto, and the circularly polarized light reflection layer 18 may include two or more reflection regions having different selective reflection wavelengths.

Figure 5:
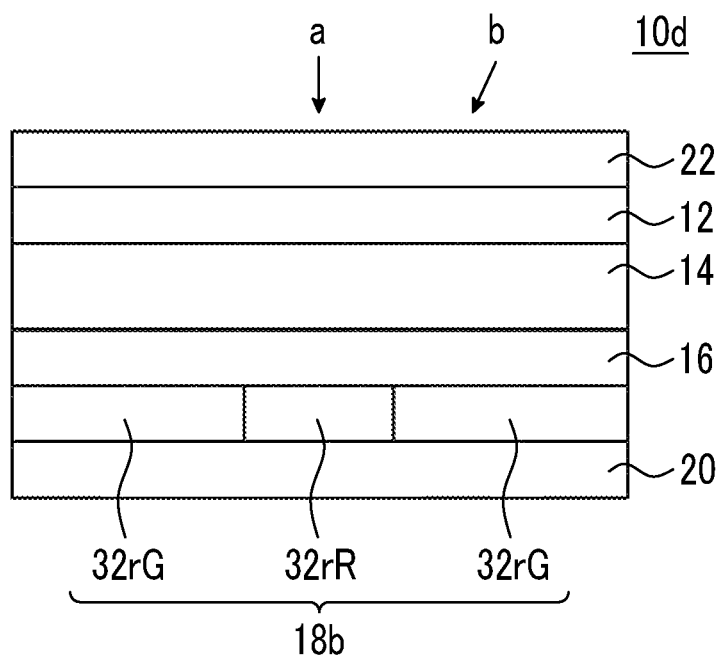
FIG. 5 is a cross section view schematically showing still another example of the decorative film according to the embodiment of the present invention.

A decorative film 10d shown in FIG. 5 includes the antireflection layer 22, the linear polarization plate 12, the uniaxial λ/4 plate 14, the C-plate 16, a circularly polarized light reflection layer 18b, and the colored layer 20 in this order. In FIG. 5, the support and the pressure sensitive adhesive layer are not shown.

In the decorative film 10d, the circularly polarized light reflection layer 18b includes a red right circular polarization reflection region 32rR which reflects right circularly polarized light of light (that is, red light) in a wavelength range of 620 nm to 750 nm and transmits left circularly polarized red light and light in other wavelength ranges, and a green right circular polarization reflection region 32rG which reflects right circularly polarized light of light (that is, green light) in a wavelength range of 495 nm to 570 nm and transmits left circularly polarized green light and light in other wavelength ranges.

In addition, in a plan view, the red right circular polarization reflection region 32rR and the green right circular polarization reflection region 32rG are formed in a desired pattern.

Each of the red right circular polarization reflection region 32rR and the green right circular polarization reflection region 32rG is a cholesteric liquid crystalline layer including the cholesteric liquid crystalline phase described above, and has the same configuration as that of the cholesteric liquid crystalline layer described above, except that each thereof includes a wavelength selective reflectivity with respect to a circularly polarized, light in different wavelength range.

Since the red right circular polarization reflection region 32rR and the green right circular polarization reflection region 32rG have the same configuration, except that the selective reflection wavelengths are different from each other, these are collectively referred to as a reflection region in the description hereinafter.

Figure 6:
FIG. 6 is a schematic view for describing an operation of the decorative film shown in FIG. 5.

In a case where this decorative film 10d is seen from the front (direction shown with an arrow a in the drawing), the entire component of the incident light is absorbed to the decorative film 10a and there is no reflected component, and accordingly, the decorative film is visually recognized in black, and other colors or patterns are not visually recognized (FIG. 6), in the same manner as in the case of the decorative film 10a shown in FIG. 1.

Figure 7:
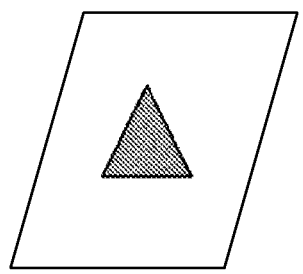
FIG. 7 is a schematic view for describing an operation of the decorative film shown in FIG. 5.

On the other hand, in a case where the decorative film 10d is seen in an oblique direction (direction shown with an arrow b in the drawing), in the same manner as in the case of the decorative film 10a shown in FIG. 1, the light at a selective reflection wavelength of the circularly polarized light reflection layer 18b is reflected and the color according thereto is visually recognized. That is, red light reflected by the red right circular polarization reflection region 32rR and green light reflected by the green right circular polarization reflection region 32rG are visually recognized in a pattern according to formation patterns of the red right circular polarization reflection region 32rR and the green right circular polarization reflection region 32rG. For example, in a plan view, in a case where the decorative film including the circularly polarized light reflection layer 18b in which the red right circular polarization reflection region 32rR is formed in a triangle shape and the surrounding region thereof is formed with the green right circular polarization reflection region 32rG, is seen in an oblique direction, as shown in FIG. 7, a red triangle shape and a green surrounding portion are visually recognized.

As described above, with the configuration of the circularly polarized light reflection layer including the plurality of reflection regions having different selective reflection wavelengths, it is possible to apply a visual effect of making a pattern not visually recognizable, in a case where it is seen from the front, and making it visually recognizable as a pattern, in a case where it is obliquely seen.

In the example shown in FIG. 5, the circularly polarized light reflection layer 18b is configured to include two kinds of reflection regions having different selective reflection wavelengths, but there is no limitation thereto, and the circularly polarized light reflection layer may be configured to include three or more kinds of reflection regions.

In addition, in the example shown in FIG. 5, the circularly polarized light reflection layer 18b is configured to include the reflection region having a wavelength of red fight (light in a wavelength range of 620 nm to 750 nm) as the selective reflection wavelength and the reflection region having a wavelength of green light (light in a wavelength range of 495 nm to 570 nm) as the selective reflection wavelength, but there is no limitation thereto. For example, the circularly polarized light reflection layer may include a reflection region having a wavelength of blue light (light in a wavelength range of 420 nm to 490 nm) as the selective reflection wavelength or a reflection region having other wavelength ranges as the selective reflection wavelength.

As an example, a reflection region having a wavelength of an infrared light as the selective reflection wavelength may be included. The infrared light is light in a wavelength range higher than 780 nm and equal to or lower than 1 mm, and among these, near infrared light is light in a wavelength range higher than 780 nm and equal to or lower than 2,000 nm.

In the example shown in FIG. 1, the circularly polarized light reflection layer 18 is configured to be formed of one cholesteric liquid crystalline layer, but there is no limitation thereto. The circularly polarized light reflection layer may be configured to be formed of two or more layers having different selective reflection wavelengths.

With the configuration in which two or more reflection layers having different selective reflection wavelengths are laminated, various colors including white light can be visually recognized, in a case where the film is obliquely seen.

Figure 8:
FIG. 8 is a cross section view schematically showing still another example of the decorative film according to the embodiment of the present invention.

In addition, in a case where the circularly polarized light reflection layer is configured to include a plurality of layers, as shown in a decorative film 10f shown in FIG. 8, it is preferable to provide the C-plate 16 between the plurality of circularly polarized light reflection layers 18.

The decorative film 10f shown in FIG. 8 includes the antireflection layer 22, the linear polarization plate 12, the uniaxial λ/4 plate 14, the C-plate 16, the circularly polarized light reflection layer 18, the C-plate 16, the circularly polarized light reflection layer 18, and the colored layer 20 in this order.

The C-plate 16 disposed between the two circularly polarized light reflection layer 18 has the same configuration as that of the C-plate described above, except that the disposed position is different.

The circularly polarized light reflection layer also functions as the C-plate, and accordingly, in a case of the configuration including the plurality of circularly polarized light reflection layers, light incident to the lower circularly polarized light reflection layer in an oblique direction receives the effect of the C-plate due to the upper circularly polarized light reflection layer. Accordingly, in order to obtain sufficient reflection by the lower circularly polarized light reflection layer, it is necessary to offset the C-plate effect due to the upper circularly polarized light reflection layer. Therefore, as described above, with the configuration of including the C-plate between the plurality of circularly polarized light reflection layer, sufficient reflected light is obtained from each circularly polarized light reflection layer.

For example, in a case where the C-plate 16 disposed on the circularly polarized light reflection layer 18 is the positive C-plate, the C-plate 16 disposed between the plurality of circularly polarized light reflection layers 18 is preferably the negative C-plate, and in a case where the C-plate 16 disposed on the circularly polarized light reflection layer 18 is the negative C-plate, the C-plate 16 disposed between the plurality of circularly polarized light reflection layers 18 is preferably the positive C-plate.

The decorative film according to the embodiment of the present invention may be configured to further include a second circularly polarized light reflection layer on a side close to the outermost surface on the linear polarization plate side than the laminate of the uniaxial retardation layer or the biaxial retardation layer.

Figure 9:
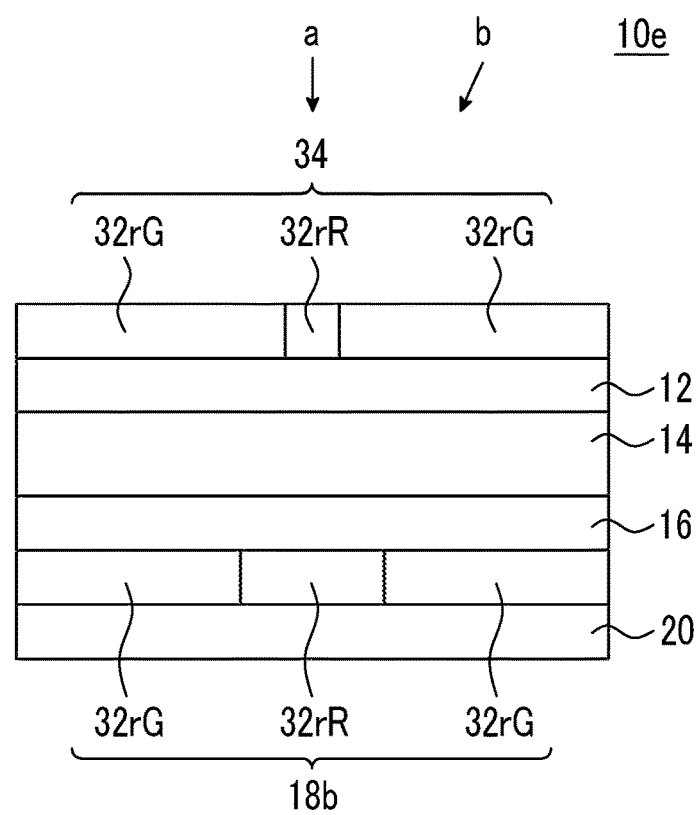
FIG. 9 is a cross section view schematically showing still another example of the decorative film according to the embodiment of the present invention.

A decorative film 10e shown in FIG. 9 includes a second circularly polarized light reflection layer 34, the linear polarization plate 12, the uniaxial λ/4 plate 14, the C-plate 16, the circularly polarized light reflection layer 18b, and the colored layer 20 in this order. The decorative film 10e shown in FIG. 9 has the same configuration as that of the decorative film 10d shown in FIG. 5, except that the second circularly polarized light reflection layer 34 is included, instead of the antireflection layer 22.

In the decorative film 10e shown in FIG. 9, the second circularly polarized light reflection layer 34 includes a red right circular polarization reflection region 32rR which reflects right circularly polarized light of light (that is, red light) in a wavelength range of 620 nm to 750 nm and transmits left circularly polarized red light and light in other wavelength ranges, and a green right circular polarization reflection region 32rG which reflects right circularly polarized light of light (that is, green light) in a wavelength range of 495 nm to 570 nm and transmits left circularly polarized green light and light in other wavelength ranges.

The red right circular polarization reflection region 32rR and the green right circular polarization reflection region 32rG of the second circularly polarized light reflection layer 34 basically have the same configurations as those of the red right circular polarization reflection region 32rR and the green right circular polarization reflection region 32rG of the circularly polarized light reflection layer 18b.

In addition, in a plan view, the red right circular polarization reflection region 32rR and the green right circular polarization reflection region 32rG of the second circularly polarized light reflection layer 34 are formed in a desired pattern.

Here, the formation pattern of the reflection region of the second circularly polarized light reflection layer 34 is formed in a pattern different from the formation pattern of the reflection region of the circularly polarized light reflection layer 18b.

Among light components vertically (direction shown with an arrow a in the drawing) incident to the decorative film 10e having such a configuration, a right circularly polarized light component is reflected by the second circularly polarized light reflection layer 34. In addition, a left circularly polarized light component is transmitted through the second circularly polarized light reflection layer 34 and incident to the linear polarization plate 12.

Among the light incident to the linear polarization plate 12, only a linearly polarized light component in a direction same as the polarization axis is transmitted through the linear polarization plate 12 and incident to the λ/4 plate 14.

The linearly polarized light incident to the λ/4 plate 14 is converted to left circularly polarized light, incident to and transmitted through the C-plate 16, and incident to the circularly polarized light reflection layer 18b.

The left circularly polarized light incident to the circularly polarized light reflection layer 18 is transmitted through the circularly polarized light reflection layer 18b and incident to and absorbed by the colored layer 20.

Figure 10:
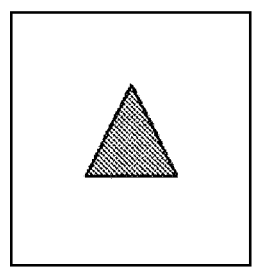
FIG. 10 is a schematic view for describing an operation of the decorative film shown in FIG. 9.

Accordingly, in a case where the light is incident to the decorative film 10e in a vertical direction, the light component other than light reflected by the second circularly polarized light reflection layer 34 is absorbed by the decorative film 10e. Therefore, as shown in FIG. 10, in a ease where the decorative film 10e is seen from the front, a color and a pattern according to the second circularly polarized light reflection layer 34 are visually recognized.

Meanwhile, among light components incident to the decorative film 10e in an oblique direction (direction shown with an arrow b in the drawing), a right circularly polarized light component is reflected by the second circularly polarized light reflection layer 34. In addition, a left circularly polarized light component is transmitted through the second circularly polarized light reflection layer 34 and incident to the linear polarization plate 12.

Among the light incident to the linear polarization plate 12, only a linearly polarized light component in a direction same as the polarization axis is transmitted through the linear polarization plate 12 and incident to the λ/4 plate 14.

The linearly polarized light incident to the λ/4 plate 14 is converted to left circularly polarized light and incident to the C-plate 16.

The left circularly polarized light incident to the C-plate 16 is incident to the C-plate in an oblique direction, and accordingly, a polarization state is changed due to a retardation of the C-plate 16 in a thickness direction to a state including the left circularly polarized light component and the right circularly polarized light component (preferably, changed to a right circularly polarized light component), and the light is incident to the circularly polarized light reflection layer 18b.

The left circularly polarized light component incident to the circularly polarized light reflection layer 18b is transmitted through the circularly polarized light reflection layer 18b, incident to the colored layer 20, and absorbed by the colored layer 20.

Meanwhile, the right circularly polarized light component incident to the circularly polarized light reflection layer 18b is reflected by the circularly polarized light reflection layer 18b and incident to the C-plate 16 again.

The right circularly polarized light component incident to the C-plate 16 is incident to the C-plate 16 in an oblique direction, a polarization state is changed due to a retardation of the C-plate 16 in a thickness direction to a state including the right circularly polarized light component and the left circularly polarized light component, and the light is incident to the λ/4 plate 14.

The right circularly polarized light component incident to the λ/4 plate 14 is converted to linearly polarized light by the λ/4 plate 14, and is absorbed to the linear polarization plate 12, because the polarization direction thereof does not coincide with a direction of the polarization axis of the linear polarization plate 12.

Meanwhile, the left circularly polarized light component incident to the λ/4 plate 14 is converted to linearly polarized light by the λ/4 plate 14, is transmitted through the linear polarization plate 12 and incident to the second circularly polarized light reflection layer 34, because the polarization direction thereof coincides with a direction of the polarization axis of the linear polarization plate 12.

The linearly polarized light incident to the second circularly polarized light reflection layer 34 is transmitted through the second circularly polarized light reflection layer 34.

Figure 11:
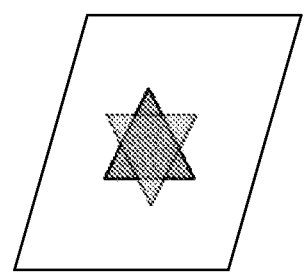
FIG. 11 is schematic view for describing an operation of the decorative film shown in FIG. 9.

As described above, in a case where the light is incident to the decorative film 10e in an oblique direction, a part of the incident light component is reflected by any of the second circularly polarized light reflection layer 34 and the circularly polarized light reflection layer 18b. Therefore, in a case where the decorative film 10e is seen in an oblique direction, as shown in FIG. 11, a color and a pattern according to the selective reflection wavelength and the formation pattern of the reflection region of the circularly polarized light reflection layer 18b, and the selective reflection wavelength and the formation pattern of the reflection region of the second circularly polarized light reflection layer 34 are visually recognized in a superimposed manner.

In the example shown in FIG. 9, the second circularly polarized light reflection layer 34 is configured to include two reflection regions having different selective reflection wavelengths, and there is no limitation thereto. The second circularly polarized light reflection layer 34 may be configured to reflect light at the same selective reflection wavelength from the entire surface thereof. Alternatively, the second circularly polarized light reflection layer 34 may be configured to include three or more kinds of reflection regions having different selective reflection wavelengths.

(Manufacturing Method of Cholesteric Liquid Crystalline Layer)

Next, the cholesteric, liquid crystalline layer (reflection region) will be described.

The cholesteric liquid crystalline layer is a layer including a cholesteric liquid crystalline phase. The cholesteric liquid crystalline layer is preferably a layer formed with a fixed cholesteric liquid crystalline phase, but there is no limitation. In a case of displaying a still image, a layer formed with a fixed cholesteric, liquid crystalline phase is preferable, and in a case of displaying a motion image, it is preferable that the cholesteric liquid crystalline phase is not fixed.

The structure in which the cholesteric liquid crystalline phase is fixed may be a structure in which the alignment of the liquid crystal compound becoming the cholesteric liquid crystalline phase is maintained, and may be a structure in which, typically, a polymerizable liquid crystal compound is set in an alignment state of a cholesteric liquid crystalline phase, polymerized and cured by ultraviolet light irradiation or heating, to form a layer not having fluidity, and at the same time, the alignment aspect is changed to a state which does not change due to the external field or the external force. In the structure in which the cholesteric liquid crystalline phase is fixed, it is enough, as long as the optical properties of the cholesteric liquid crystalline phase are maintained, and the liquid crystal compound may not have liquid crystal properties. For example, the polymerizable liquid crystal compound may lose liquid crystal properties due to an increase in molecular weight due to a curing reaction.

As the material used in the formation of the cholesteric liquid crystalline layer, a liquid crystal composition including a liquid crystal compound or the like is used. The liquid crystal compound is preferably a polymerizable liquid crystal compound.

The liquid crystal composition including a polymerizable liquid crystal compound may further include a surfactant, a chiral agent, or a polymerization initiator.

——Polymerizable Liquid Crystal Compound——

The polymerizable liquid crystal compound may be a rod-like liquid crystal compound or a disk-like liquid crystal compound, and a rod-like liquid crystal compound is preferably used.

As an example of a rod-like polymerizable liquid crystal compound for forming the cholesteric liquid crystalline layer, a rod-like nematic liquid crystal compound may be used. As a rod-like nematic liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenylcyclohexylbenzonitriles are preferably used. Not only a low-molecular-weight liquid crystal compound, but also a high-molecular-weight liquid crystal compound can be used.

A polymerizable liquid crystal compound is obtained by introducing a polymerizable group to the liquid crystal compound. Examples of the polymerizable group include an unsaturated polymerizable group, an epoxy group, and an aziridinyl group, an unsaturated polymerizable group is preferable and an ethylenically unsaturated polymerizable group is particularly preferable. The polymerizable group can be introduced into molecules of the liquid crystal compound by various methods. The number of polymerizable groups included in the polymerizable liquid crystal compound is preferably 1 to 6 and more preferably 1 to 3. Examples of the polymerizable liquid crystal compound include compounds disclosed in Makromol. Chem., vol. 190, 2255 p, (1989), Advanced Materials, vol. 5, 107 p (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-1-H1-080081A), and JP2001-328973A. Two or more kinds of polymerizable liquid crystal compounds may be used in combination. In a case where two or more kinds of polymerizable liquid crystal compounds are used in combination, it is possible to decrease an alignment temperature.

Specific examples of the polymerizable liquid crystal compound include compounds shown in Formulae (1) to (11).

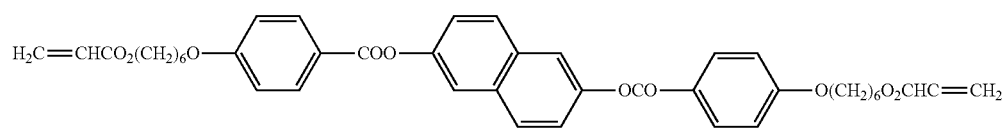
(1)

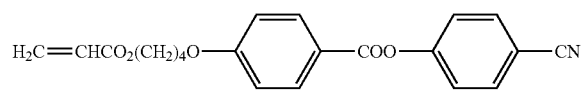
(2)

(3)

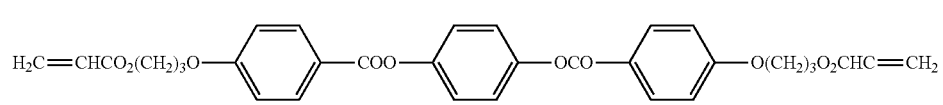
(4)

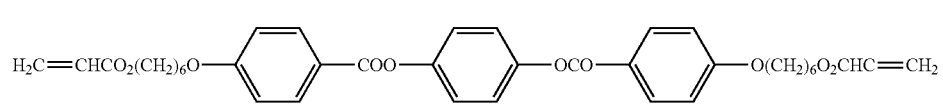
(5)

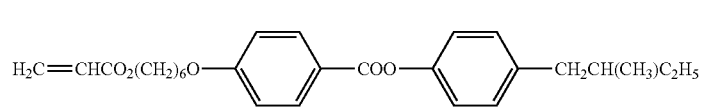
(6)

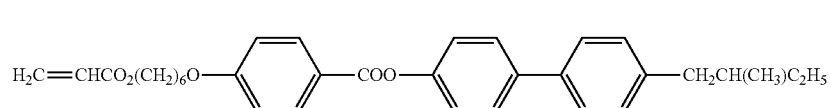
(7)

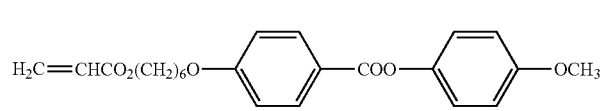
(8)

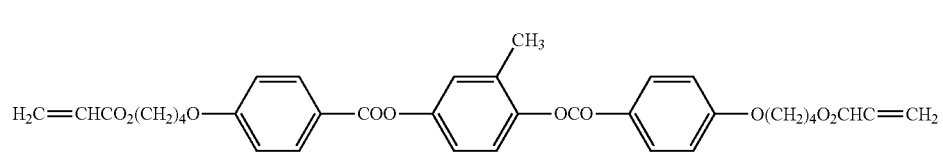
(9)

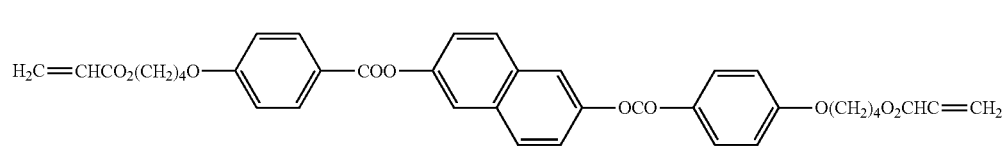
(10)

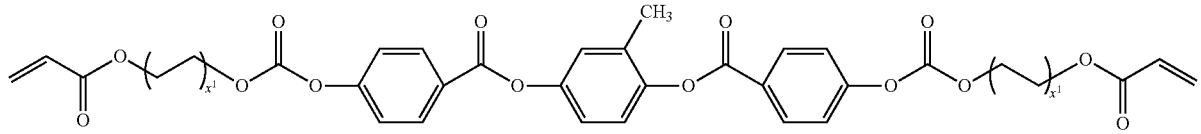

(11)

[In the compound (11), $X^1$ is 2 to 5 (integer).]

In addition, as the polymerizable liquid crystal compound other than the polymerizable liquid crystal compound described above, a cyclic organopolysiloxane compound including a cholesteric phase disclosed in JP1982-165480A (JP-S57-165480A) can be used. Further, as the high-molecular-weight liquid crystal compound described above, a polymer obtained by introducing a mesogenic group having liquid crystal to a main chain, a side chain, or both positions of the main chain and the side chain, a high-molecular-weight cholesteric liquid crystal obtained by introducing a cholesteric group to a side chain, a liquid crystal polymer disclosed in JP1997-133810A (JP-H09-133810A), and a liquid crystal polymer disclosed in JP1999-293252A (JP-H11-293252A) can be used.

In addition, the added amount of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

——Chiral Agent (Optically Active Compound)——

The chiral agent has a function of inducing the helical structure of the cholesteric liquid crystalline phase. Since the induced twisted direction of the helix or the helical pitch varies according to the compound, the chiral compound may be selected according to the purpose.

The chiral agent is not particularly limited, and well-known compounds (for example, Liquid Crystal Device Handbook, third vol. paragraphs 4-3, a chiral agent for twisted nematic (TN) or super-twisted nematic (STN), p. 199, Japan Society for the Promotion of Science 142th Committee Edition, 1989), isosorbide, or an isomannide derivative can be used.

The chiral agent generally includes asymmetric carbon atoms, but an axial asymmetric compound or a planar asymmetric compound not including asymmetric carbon atoms can be used as the chiral agent. As an example of an axial asymmetric compound or a planar asymmetric compound, binaphthyl, helicene, paracyclophane, and derivatives thereof are included. The chiral agent may include a polymerizable group. In a case where both of the chiral agent and the liquid crystal compound include a polymerizable group, it is possible to form a polymer including a repeating unit derived from the polymerizable liquid crystal compound and a repeating unit derived from the chiral agent, by the polymerization reaction between the polymerizable chiral agent and the polymerizable liquid crystal compound. In this aspect, the polymerizable group included in the polymerizable chiral agent is preferably the same kind of group as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and particularly preferably an ethylenically unsaturated polymerizable group.

In addition, the chiral agent may be a liquid crystal compound.

As will be described later, in a case of controlling a size of the helical pitch of the cholesteric liquid crystalline phase in accordance with the light irradiation, in a case of manufacturing the cholesteric liquid crystalline layer, a chiral agent sensitive to light and capable of changing the helical pitch of the cholesteric liquid crystalline phase (hereinafter, also referred to as a photosensitive chiral agent) is preferably used.

The photosensitive chiral agent is a compound, the structure of which is changed by absorbing light, and which changes the helical pitch of the cholesteric liquid crystalline phase. As such a compound, a compound which causes at least one of a photoisomerization reaction, a photo dimerization reaction, or a photodegradation reaction is preferable.

The compound causing the photoisomerization reaction is a compound causing stereoisomerization or structure isomerization by the operation of light. Examples of the photoisomerization compound include an azobenzene compound, and a spiropyran compound.

In addition, the compound causing the photo dimerization reaction is a compound which cyclizes by causing an addition reaction between two groups due to the light irradiation. Examples of the photo dimerization compound include a cinnamic acid derivative, a coumarin derivative, a chalcone derivative, and a benzophenone derivative.

As the photosensitive chiral agent, a chiral agent represented by General Formula (I) is preferably used. This chiral agent may change an alignment structure of the helical pitch (twisting force or angle of twist of helix) of the cholesteric liquid crystalline phase in accordance with light intensity during the light irradiation.

General Formula (I)

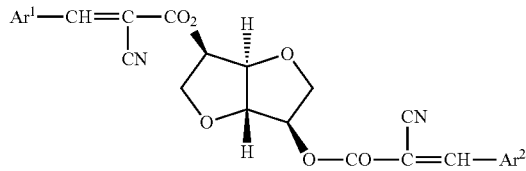

In General Formula (I), $Ar^1$ and $Ar^2$ represent an aryl group or a heteroaromatic ring group.

The aryl group represented by $Ar^1$ and $Ar^2$ may include a substituent, a total number of carbon atoms is preferably 6 to 40 and more preferably 6 to 30. As the substituent, for example, a halogen atom, an alkyl group, an alkenyl group, an alkynyl group, an alkoxy group, a hydroxyl group, an acyl group, an alkoxycarbonyl group, an aryloxycarbonyl group, an acyloxy group, a carboxyl group, a cyano group, or a heterocyclic group is preferable, and a halogen atom, an alkyl group, an alkenyl group, an alkoxy group, a hydroxyl group, an acyloxy group, an alkoxycarbonyl group, or an aryloxycarbonyl group is more preferable.

Among such aryl groups, an aryl group represented by General Formula (III) or (IV) is preferable.

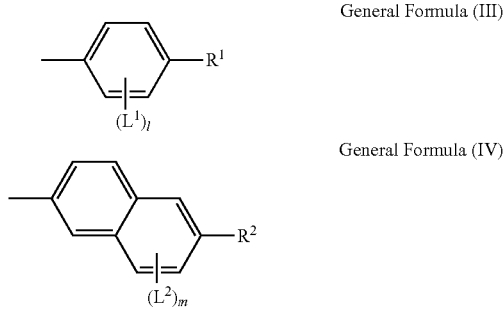

General Formula (III)

General Formula (IV)

$R^1$ in General Formula (III) and $R^2$ in General. Formula (IV) each independently represent a hydrogen atom, a halogen atom, an alkyl group, an alkenyl group, an alkynyl group, an aryl group, a heterocyclic group, an alkoxy group, a hydroxyl group, an acyl group, an alkoxycarbonyl group, an aryloxycarbonyl group, an acyloxy group, a carboxyl group, or a cyano group. Among these, a hydrogen atom, a halogen atom, an alkyl group, an alkenyl group, an aryl group, an alkoxy group, a hydroxyl group, an alkoxycarbonyl group, an aryloxycarbonyl group, or an acyloxy group is preferable, and an alkoxy group, a hydroxyl group, or an acyloxy group is more preferable.

$L^1$ in General Formula (III) and $L^2$ in General Formula (IV) each independently represent a halogen atom, an alkyl group, an alkoxy group, or a hydroxyl group, and an alkoxy group having 1 to 10 carbon atoms or a hydroxyl group is preferable.

l represents an integer of 0, 1 to 4 and 0 or 1 is preferable. m represents an integer of 0, 1 to 6 and 0 or 1 is preferable. In a case where l or m is equal to or greater than 2, $L^1$ and $L^2$ may represent groups different from each other.

A heteroaromatic ring group represented by $Ar^1$ and $Ar^2$ may include a substituent, and a total number of carbon atoms is preferably 4 to 40 and more preferably 4 to 30. As the substituent, for example, a halogen atom, an alkyl group, an alkenyl group, an alkynyl group, an aryl group, an alkoxy group, a hydroxyl group, an acyl group, an alkoxycarbonyl group, an aryloxycarbonyl group, an acyloxy group, or a cyano group is preferable, and a halogen atom, an alkyl group, an alkenyl group, an aryl group, an alkoxy group, or an acyloxy group is more preferable.

Examples of the heteroaromatic ring group include a pyridyl group, a pyrimidinyl group, a furyl group, and a benzofuranyl group, and among these, a pyridyl group or a pyrimidinyl group is preferable.

A content of the chiral agent in the liquid crystal composition is preferably 0.01 mol % to 200 mol % and more preferably 1 mol % to 30 mol % with respect to the amount of the polymerizable liquid crystal compound.

——Polymerization Initiator——

In a case where the liquid crystal composition includes the polymerizable compound, the liquid crystal composition preferably includes a polymerization initiator. In an aspect of causing the polymerization reaction to proceed using the ultraviolet light irradiation, the polymerization initiator used is preferably a photopolymerization initiator which can start the polymerization reaction by an ultraviolet light irradiation. Examples of the photopolymerization initiator include an α-carbonyl compound (disclosed in each specification of U.S. Pat. Nos. 2,367,661A and 2,367,670A), acyloin ether (disclosed in the specification of U.S. Pat. No. 2,448,828A), an α-hydrocarbon-substituted aromatic acyloin compound (disclosed in the specification of U.S. Pat. No. 2,722,512A), a polynuclear quinone compound (disclosed in each specification of U.S. Pat. Nos. 3,046,127A and 2,951,758A), a combination of a triaryl imidazole dirtier and p-amino phenyl ketone (disclosed in the specification of U.S. Pat. No. 3,549,367A), acridine and phenazine compounds (disclosed in each specification of JP1985-105667A (JP-S60-105667A) and U.S. Pat. No. 4,239,850A), and an oxadiazole compound (disclosed in the specification of U.S. Pat. No. 4,212,970A).

A content of the photopolymerization initiator in the liquid crystal composition is preferably 0.1% to 20% by mass and more preferably 0.5% by mass to 12% by mass, with respect to the content of the polymerizable liquid crystal compound.

——Cross-Linking Agent——

The liquid crystal composition may randomly include a cross-linking agent, in order to improve film hardness after the curing and durability. As the cross-linking agent, a material which is cured by ultraviolet light, heat, or humidity can be preferably used.

The cross-linking agent is not particularly limited and can be suitably selected according to the purpose, and examples thereof include a polyfunctional acrylate compound such as trimethylolpropane tri(meth)acrylate or pentaerythritol tri(meth)acrylate; an epoxy compound such as glycidyl (meth)acrylate or ethylene glycol diglycidyl ether; an aziridine compound such as 2,2-bishydroxymethylbutanol-tris[3-(1-aziridinyl)propionate] or 4,4-bis (ethylene iminocarbonyl amino)diphenylmethane; an isocyanate compound such as hexamethylene diisocyanate or biuret type isocyanate; a polyoxazoline compound including an oxazoline group as a side chain; and an alkoxysilane compound such as vinyltrimethoxysilane or N-(2-aminoethyl)3-aminopropyltrimethoxysilane. In addition, a well-known catalyst can be used according to the reactivity of the cross-linking agent and it is possible to improve productivity, in addition to the improvement of film hardness and durability. These may be used alone or in combination of two or more kinds thereof.

A content of the cross-linking agent is preferably 3% by mass to 20% by mass and more preferably 5% by mass to 15% by mass. In a case where the content of the cross-linking agent is less than 3% by mass, an effect of cross-linking density improvement is obtained, and in a case where the content thereof is more than 20% by mass, stability of the cholesteric liquid crystalline layer may be deteriorated.

——Other Additives——

If necessary, a surfactant, a polymerization inhibitor, an antioxidant, a horizontal alignment agent, an ultraviolet absorbing agent, a light stabilizer, a coloring material, and metal oxide fine particles can be added to the liquid crystal composition, in a range not decreasing the optical performance.

The liquid crystal composition may include a solvent. The solvent is not particularly limited and can be suitably selected according to the purpose, and an organic solvent is preferable.

The organic solvent is not particularly limited and can be suitably selected according to the purpose, and examples thereof include ketones such as methyl ethyl ketone, methyl isobutyl ketone alkyl halides, amides, sulfoxides, heterocyclic compounds, hydrocarbons, esters, and ethers. These may be used alone or in combination of two or more kinds thereof. Among these, in a case of considering environmental load, ketones are particularly preferable. The component described above such as the monofunctional polymerizable monomer may function as the solvent.

(Manufacturing Method of Decorative Film)

Hereinafter, the manufacturing method of the decorative film will be described.

First, a liquid crystal composition including a polymerizable liquid crystal compound and a photosensitive chiral agent which becomes a cholesteric liquid crystalline layer is prepared.

Next, the liquid crystal composition which becomes a cholesteric liquid crystalline layer is applied on a support and a coated layer is formed. As a coating method, a well-known method can be used. In addition, if necessary, after applying the liquid crystal composition, the drying process may be performed.

An exposure treatment is performed on the coated layer by using an exposure device which emits light at a wavelength to which the photosensitive chiral agent is sensitive, and the exposed coated layer is formed. The photosensitive chiral agent is sensitive to the exposed coated layer, and a structure of the coated layer is changed.

In addition, a heating treatment (aging treatment) is performed on the coated layer using a heating device, and the heated coated layer is formed. In the coated layer, a liquid crystal compound is aligned and a cholesteric liquid crystalline phase is formed. Accordingly, the cholesteric liquid crystalline layer is formed on the support.

After that, the C-plate, the λ/4 plate, the linear polarization plate, and the like are laminated on the cholesteric liquid crystalline layer formed on the support, in this order. In addition, the colored layer is laminated on the surface on a side opposite to the surface where the C-plate and the like are laminated. Accordingly, a decorative film can be manufactured.

In the example described above, the decorative film displays a still image by the reflected light of the cholesteric liquid crystalline layer, but there is no limitation.

For example, by referring to methods disclosed in US2016/0033806A, JP5071388B, OPTICS EXPRESS 2016 vol. 24 No. 20 P23027-23036, the cholesteric liquid crystalline layer is not completely UV-cured and is set in a state where the alignment of the liquid crystalline phase of the cholesteric liquid crystalline layer can be changed due to a voltage application or a temperature change, and accordingly, a pattern of the cholesteric liquid crystalline layer is changed to change pictures and characters displayed, that is, a motion image may be displayed.

Hereinabove, the decorative film according to the embodiment of the present invention has been described in detail, but the present invention is not limited to the examples described above, and various modifications or changes may be performed within a range not departing from the gist of the present invention.

EXAMPLES

Hereinafter, the present invention will be described more specifically with reference to examples. The materials, the reagents, the used amount, the amounts of materials, the rate, the processing details, and process procedures shown in the following examples can be suitably changed, as long as the gist of the present invention is not departed. Therefore, the scope of the present invention is not limitedly translated by the specific examples shown below.

Example 1

As Example 1, a decorative film including a linear polarization plate, a uniaxial λ/4 plate, a positive C-plate, and a circularly polarized light reflection layer in this order was manufactured.

<Manufacturing of Linear Polarization Plate>

(Manufacturing of Polarizer)

A polyvinyl alcohol film having a thickness of 75 µm formed of polyvinyl alcohol having an average polymerization degree of approximately 2,400 and a degree of saponification of 99.9 mol % or more was immersed in pure water at 30° C., and immersed in an aqueous solution having a mass ratio of iodine/potassium iodide/water of 0.02/2/100 at 30° C. Then, the film was immersed in an aqueous solution having a mass ratio of potassium iodide/boric acid/water of 12/5/100 at 56.5° C.

Then, the film was washed with pure water at 8° C., dried at 65° C., and a polarizer in which iodine is adsorbed and aligned on the polyvinyl alcohol film was obtained. The stretching was mainly performed in a step of iodine dyeing and boric acid treatment, and a total stretching ratio was 5.3 times.

(Bonding of Support)

A commercially available cellulose acetate film (Fujitac TG60, manufactured by FUJIFILM Corporation) was subjected to a saponification treatment and bonded to the polarizer by using a polyvinyl alcohol-based adhesive, and a linear polarization plate was obtained.

<Uniaxial λ/4 Plate>

As the uniaxial λ/4 plate, a commercially available λ/4 plate (MCR140N manufactured by MeCan Imaging, Inc.) was used.

<Manufacturing of Positive C-plate>

As the positive C-plate, an optically anisotropic layer formed of a rod-like liquid crystal compound was manufactured as follows.

(Formation of Alignment Film)

100 parts by mass of two kinds of the following acryl-based compounds (pentaerythritol tetraacrylate (PETA)/glycerin monomethacrylate (GLM)=100/50 (mass ratio)) and 4 parts by mass of a photopolymerization initiator (IRGAGURE 127, manufactured by Ciba Inc.) were mixed in a solvent (methyl acetate:methyl isobutyl ketone=35:65 (mass ratio)), and an alignment film forming composition was prepared so as to have a concentration of solid contents of 30%. The alignment film forming composition prepared as described above was applied on a commercially available cellulose acetate film TG60 with a wire bar coater #1.6 so that the applied amount becomes 8.4 ml/m$^2$, dried at 40° C. for 0.5 minutes, and subjected to ultraviolet light (UV) irradiation of 54 mJ and cross-linking using a high pressure mercury vapor lamp at 120 W/cm at 30° C. for 30 seconds.

(Formation of Optically Anisotropic Layer)

An optically anisotropic layer coating solution shown below was applied on the alignment film with a wire bar #14. This was bonded to a metal frame and heated in a constant-temperature tank at 100° C. for 2 minutes, to align the rod-like liquid crystal compound (homeotropic alignment). Then, the coating was cooled to 50° C., and irradiated with ultraviolet light having illuminance of 190 mW/cm$^2$ and irradiation intensity of 310 mJ/cm$^2$ at 40° C. (UV temperature during the immobilization), by using an air-cooled metal halide lamp (manufactured by Eye Graphics Co., Ltd.) at 160 W/cm² with an oxygen concentration under nitrogen purge of approximately 0.1%, and the coated layer was cured. After that, the coated layer was dried at 70° C. Re was 0.1 nm and Rth was −750 nm.

—Composition of Optically Anisotropic Layer—

Liquid crystal compound (mixture including liquid crystal compound B01:liquid crystal compound B02=90:10 (mass ratio)): 100 parts by mass Homeotropic alignment agent (S01): 1 part by mass
Adhesion Enhancement agent: 0.25 parts by mass
Leveling agent: 0.8 parts by mass
Polymerization initiator: 3 parts by mass
Sensitizer: 1 part by mass
Acryl-based binding agent: 8 parts by mass
Solvent: methyl ethyl ketone/cyclohexane (=86/14(% by mass)), amount so that the concentration of solid contents becomes 33% by mass

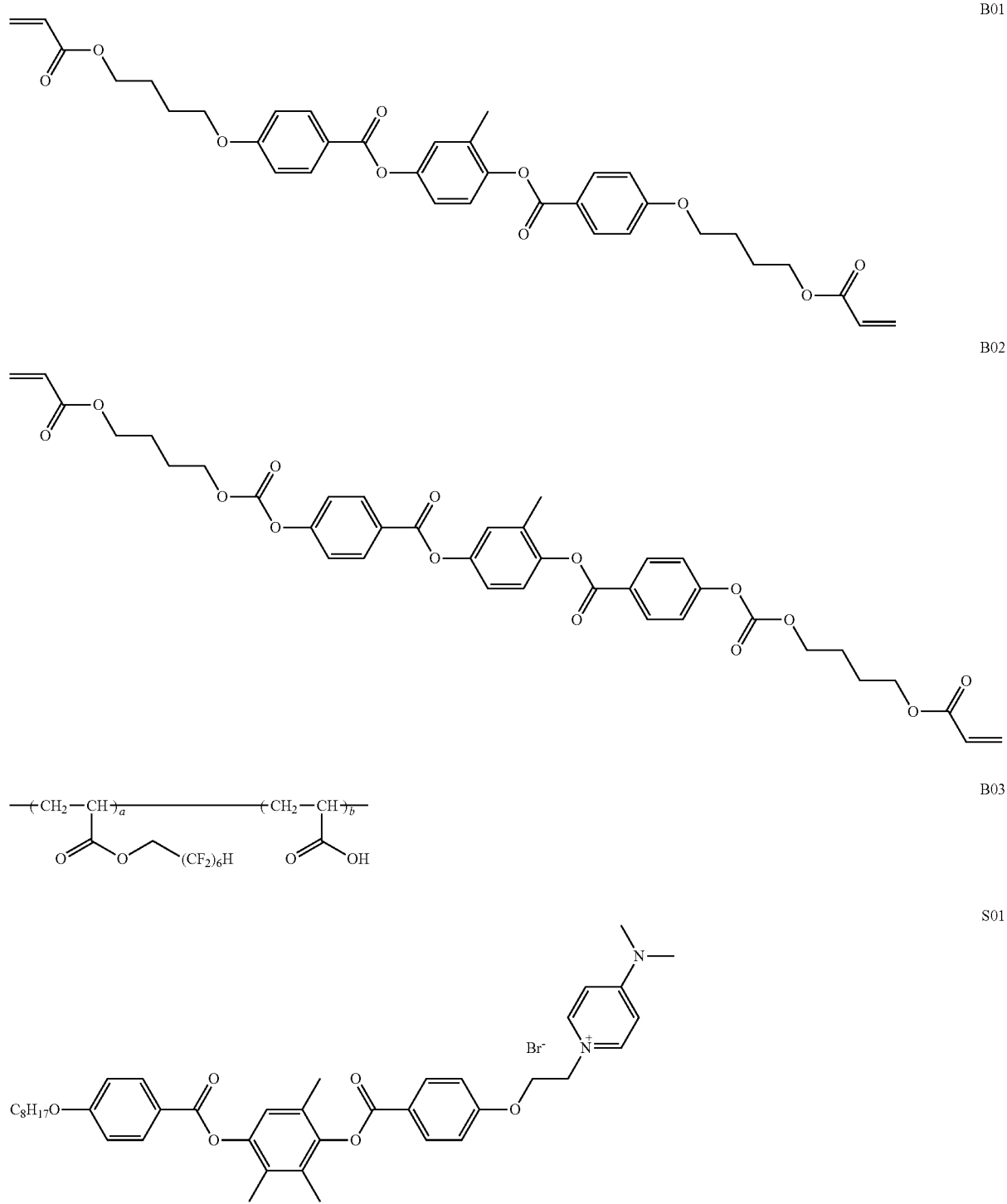

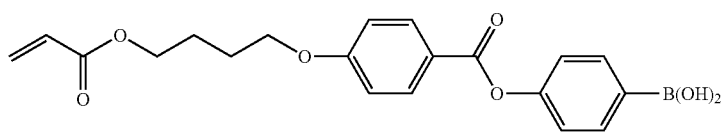

S02

<Manufacturing of Circularly Polarized Light Reflection Layer: Cholesteric Liquid Crystalline Layer 1>

(Preparation of Liquid Crystal Composition)

The composition shown below was stirred and dissolved in a container kept warm 25° C., and a cholesteric liquid crystalline ink solution A (liquid crystal composition) as prepared.

Cholesteric liquid crystalline ink solution A

Mixture of the following liquid crystal compound: 1 g
Chiral agent 2 having structure below: 56 mg
Horizontal alignment agent 1 having structure below: 1 mg
Initiator: IRGACURE 907 (manufactured by BASF): 40 mg
IRGANOX1010: 10 mg
MEK (methyl ethyl ketone): 1.6 g

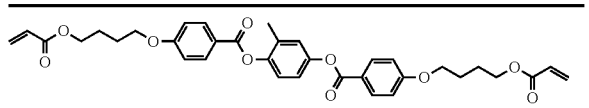

Liquid Crystal Compound 1

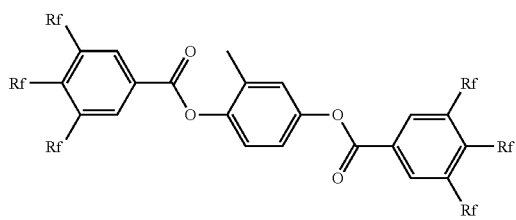

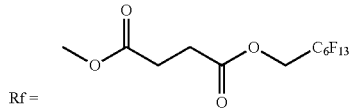

Horizontal Alignment Agent 1

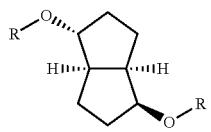

Chiral Agent 2

(Formation of Cholesteric Liquid Crystalline Layer)

The cholesteric liquid crystalline ink solution A prepared as described above was applied on a temporary support with a wire bar by using a polyethylene terephthalate (PET, COSMOSHINE A4100) film manufactured by Toyobo Co., Ltd. having a thickness of 100 μm as the temporary support. The applying was performed at room temperature by adjusting a thickness of a coated layer after the drying to be approximately 2 to 5 μm, and a coating was formed.

Next, the temporary support on which the coated layer was laminated, was left still on a hot plate at 100° C. for 1 minute and subjected to heating treatment.

Next, the UV irradiation was performed on the coated layer after the heating treatment for a certain period of time at room temperature under a nitrogen atmosphere (oxygen concentration of 500 ppm or less), and the coated layer was cured.

After that, the cured coated layer was cut to have a desired shape, and a cholesteric liquid crystalline layer 1 was formed. The formed cholesteric liquid crystalline layer 1 has a right-twisted cholesteric liquid crystalline phase and reflects right circularly polarized red light from the front.

<Manufacturing of Decorative Film>

Each layer manufactured as described above was bonded by using a pressure sensitive adhesive (MCS70: manufactured by MeCan Imaging, Inc.) so that the linear polarization plate, the uniaxial λ/4 plate, the positive C-plate, and the circularly polarized light reflection layer are laminated in this order, and a decorative film was manufactured.

Example 2

As Example 2, the same decorative film as in Example 1 was manufactured, except that the antireflection layer is provided on the linear polarization plate.

In Example 2, in the manufacturing of the linear polarization plate, a support attached with the antireflection layer shown below was used as the support bonded to the polarizer.

<Manufacturing of Support Attached with Antireflection Layer>

The antireflection film manufactured as shown below was subjected to the saponification treatment and bonded to the polarizer by using a polyvinyl alcohol-based adhesive, and the support attached with the antireflection layer was obtained.

<Manufacturing of Antireflection Film: Antireflection Layer 1>

(Preparation of Coating Solution for Hard Coat Layer)

The following composition was put in a mixing tank and stirred to obtain a coating solution for a hard coat layer.

750.0 parts by weight of trimethylolpropane triacrylate (TMPTA, manufactured by Nippon Kayaku Co., Ltd.), 270.0 parts by mass of poly(glycidyl methacrylate) having a weight-average molecular weight of 15,000, 730.0 parts by mass of methyl ethyl ketone, 500.0 parts by mass of cyclohexane, and 50.0 parts by mass of a photopolymerization initiator (IRGACURE 184, manufactured by Novartis International AG), were added and stirred. The mixture was filtered with a polypropylene filter having a hole diameter of 0.4 μm, and the coating solution for a hard coat layer was prepared.

(Preparation of Titanium Dioxide Fine Particles Dispersion Liquid)

As the titanium dioxide fine particles, titanium dioxide fine particles containing cobalt and subjected to a surface treatment by using aluminum hydroxide and zirconium hydroxide (MPT-129C, manufactured by Ishihara Sangyo Kaisha, Ltd., weight ratio of $TiO^2:Co^3O^4:Al^2O^3:ZrO^2=90.5:3.0:4.0:0.5$) were used.

41.1 parts by mass of the following dispersing agent 1 and 701.8 parts by mass of cyclohexane were added to 257.1 parts by mass of these particles and dispersed with a Dinomill, and titanium dioxide dispersion liquid having a weight average diameter of 70 nm was prepared.

Dispersing agent 1

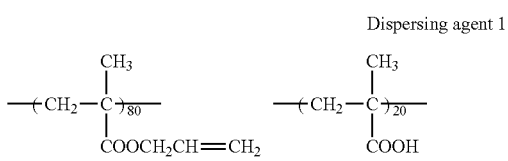

(Preparation of Coating Solution for Intermediate Refractive Index Layer)

99.1 parts by mass of the titanium dioxide dispersion liquid described above, 68.0 parts by mass of a mixture of dipentaerythritol pentaacrylate and dipentaerythritol hexaacrylate (DPHA), 3.6 parts by mass of the photopolymerization initiator (IRGACURE 907), 1.2 parts by mass of a sensitizer (KAYACURE-DETX, manufactured by Nippon Kayaku Co., Ltd.), 279.6 parts by mass of methyl ethyl ketone, and 1049.0 parts by mass of cyclohexane were added and stirred. After sufficient stirring, the mixture was filtered with a polypropylene filter having a hole diameter of 0.4 µm, and a coating solution for an intermediate refractive index layer was prepared.

(Preparation of Coating Solution for High Refractive Index Layer)

469.8 parts by mass of the titanium dioxide dispersion liquid described above, 40.0 parts by mass of a mixture of dipentaerythritol pentaacrylate and dipentaerythritol hexaacrylate (DPHA, manufactured by Nippon Kayaku Co., Ltd.), 3.3 parts by mass of the photopolymerization initiator (IRGACURE 907, manufactured by Novartis International. AG), 1.1 parts by mass of a sensitizer (KAYACURE-DETX, manufactured by Nippon Kayaku Co., Ltd.), 526.2 parts by mass of methyl ethyl ketone, and 459.6 parts by mass of cyclohexane were added and stirred. The mixture was filtered with a polypropylene filter having a hole diameter of 0.4 µm, and a coating solution for a high refractive index layer was prepared.

(Preparation of Coating Solution for Low Refractive Index Layer)

The following copolymer 1 was dissolved in methyl isobutyl ketone so as to have a concentration of 7% by mass, 3% by mass of a terminal methacrylate group-containing silicone resin X-22-164C (manufactured by Shin-Etsu Chemical. Co., Ltd.) with respect to the solid content was added, 5% by mass of a photo-radical generator IRGACURE 907 (product name) with respect to the solid content was added, and a coating solution for a low refractive index layer was prepared.

Copolymer 1

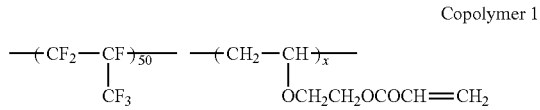

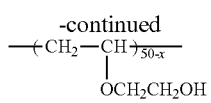

$x \geq 40$ (Manufacturing of Antireflection Film 1)

The coating solution for a hard coat layer was applied on a commercially available cellulose acetate film (Fujitac TG60, manufactured by FUJIFILM Corporation) by using a gravure coater. After drying at 100° C., the coated layer was cured by being irradiated with ultraviolet light having illuminance of 400 mW/cm² and irradiation intensity of 300 mJ/cm² by using an air-cooled metal halide lamp (manufactured by Eye Graphics Co., Ltd.) at 160 W/cm, while purging nitrogen to have an atmosphere with the oxygen concentration of 1.0 vol % or less, and a hard coat layer having a thickness of 8 µm was formed.

The coating solution for an intermediate refractive index layer, the coating solution for a high refractive index layer, and the coating solution for a low refractive index layer were continuously applied on the hard coat layer by using a gravure coater including three coating stations.

In the drying conditions of the intermediate refractive index layer, the temperature was set as 90° C. and time was set as 30 seconds, and in the ultraviolet light curing conditions, the illuminance was 400 mW/cm² and the irradiation intensity was set as 400 mJ/cm², by using an air-cooled metal halide lamp (manufactured by Eye Graphics Co., Ltd.) at 180 W/cm, while purging nitrogen to have an atmosphere with the oxygen concentration of 1.0 vol % or less.

Regarding the intermediate refractive index layer after the curing, the refractive index was 1.630 and the film thickness was 67 nm.

In the drying conditions of the high refractive index layer, the temperature was set as 90° C. and time was set as 30 seconds, and in the ultraviolet light curing conditions, the illuminance was 600 mW/cm² and the irradiation intensity was set as 400 mJ/cm², by using an air-cooled metal halide lamp (manufactured by Eye Graphics Co., Ltd.) at 240 W/cm, while purging nitrogen to have an atmosphere with the oxygen concentration of 1.0 vol % or less.

Regarding the high refractive index layer after the curing, the refractive index was 1.905 and the film thickness was 107 nm.

In the drying conditions of the low refractive index layer, the temperature was set as 90° C. and time was set as 30 seconds, and in the ultraviolet light curing conditions, the illuminance was 600 mW/cm² and the irradiation intensity was set as 600 mJ/cm², by using an air-cooled metal halide lamp (manufactured by Eye Graphics Co., Ltd.) at 240 W/cm, while purging nitrogen to have an atmosphere with the oxygen concentration of 0.1 vol % or less.

Regarding the low refractive index layer after the curing, the refractive index was 1.440 and the film thickness was 85 nm. By doing so, an antireflection film was manufactured.

Example 3

As Example 3, the same decorative film as that in Example 2 was manufactured, except that a colored layer is provided on a rear surface side of the circularly polarized light reflection layer.

In Example 3, a black ink was applied on a rear surface of the laminated cholesteric liquid crystalline layer, and a colored layer was obtained.

Example 4

As Example 4, the same decorative film as that in Example 3 was manufactured, except that the laminated order of the positive C-plate and the uniaxial λ/4 plate was reversed.

Example 5

As Example 5, the same decorative film as that in Example 3 was manufactured, except that the following negative C-plate was used, instead of the positive C-plate.

<Manufacturing of Negative C-Plate>

As the negative C-plate, an optically anisotropic layer formed of a disk-like liquid crystal compound was manufactured as follows.

(Formation of Alignment Film)

A surface of a commercially available cellulose acetate film TG60 was subjected to the saponification, and 20 ml/m² of an alignment film coating solution having the following composition was applied on this film with a wire bar coater. The drying was performed with warm air at 60° C. for 60 seconds and then with warm air at 100° C. for 120 seconds, and a film was formed.

Composition of Alignment Film Coating Solution

Modified polyvinyl alcohol shown below: 10 parts by mass
Water: 371 parts by mass
Methanol: 119 parts by mass
Glutaraldehyde: 0.5 parts by mass

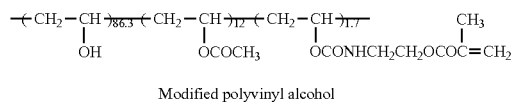

Modified polyvinyl alcohol

A coating solution including a disk-like liquid crystals having the following composition was applied on the polyvinyl alcohol-based alignment film with a wire bar.

(Coating Solution Composition of Disk-Like Liquid Crystal Layer)

Disk-like liquid crystal compound TE-8 (m of (8)=4): 32.6% by mass
Exemplified compound 1-5 shown below: 0.05% by mass
Ethylene oxide-modified trimethylolpropane triacrylate (V #360, manufactured by Osaka Organic Chemical Ind. Ltd.): 3.2% by mass
Sensitizer (KAYACURE-DETX, manufactured by Nippon Kayaku Co., Ltd.): 0.4% by mass
Photopolymerization initiator (IRGACURE 907, manufactured by Novartis International AG): 1.1% by mass
Methyl ethyl ketone: 62.0% by mass
Exemplified compound P-75 shown below: 0.14% by mass

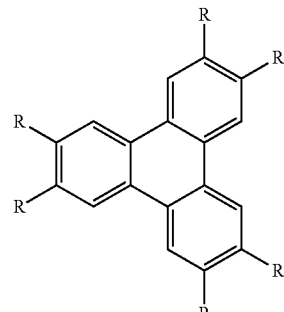

TE-8 n = 4

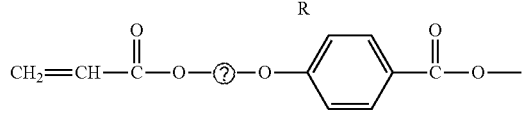

| Compound No. | R₁ | R₂ | X |
|---|---|---|---|
| I-5 | OCH$_2$(CF$_2$)$_8$H | OCH$_2$(CF$_2$)$_8$H | NH |

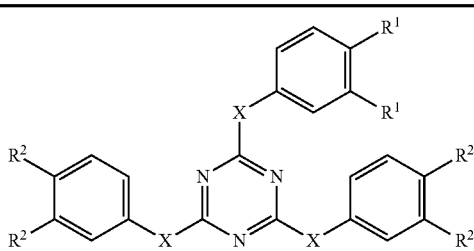

| x | R¹ | n | R² | R³ | Mw |
|---|---|---|---|---|---|
| P-75 | 90 | H | 6 | CH$_3$ | —(CH$_2$CH$_2$O)$_8$—H | 9000 |

The coating solution of the disk-like liquid crystal layer was applied and heated and dried at a drying zone at 130° C. for 2 minutes, and a disk-like liquid crystal compound was aligned. Then, the UV irradiation was performed in a UV irradiation zone using a high pressure mercury vapor lamp at 120 W/cm at 80° C. for 4 seconds, and the disk-like liquid crystal compound was polymerized.

The manufactured optically anisotropic layer shows optically negative refractive index anisotropy, and the film thickness was 85 μm, Re was 0 nm, Rth was 550 nm.

Example 6

As Example 6, the same decorative film as that in Example 5 was manufactured, except that the laminated order of the negative C-plate and the uniaxial. λ/4 plate was reversed.

Example 7

As Example 7, the same decorative film as that in Example 3 was manufactured, except that the negative C-plate and the following cholesteric liquid crystalline layer 2 were provided between the cholesteric liquid crystalline layer 1 and the colored layer.

<Manufacturing of Circularly Polarized Light Reflection Layer: Cholesteric Liquid Crystalline Layer 2>

(Preparation of Liquid Crystal Composition)

The composition shown below was stirred and dissolved in a container kept warm at 25° C., and a cholesteric liquid crystalline ink solution B (liquid crystal composition) was prepared.

| Cholesteric Liquid Crystalline Ink Solution B |
| --- |
| Mixture of the following liquid crystal compound described above: 1 g<br>Chiral agent 2 having structure described above: 80 mg<br>Horizontal alignment agent 1 having the structure described above: 1 mg<br>Initiator: IRGACURE 907 (manufactured by BASF): 40 mg<br>IRGANOX1010: 10 mg<br>MEK (methyl ethyl ketone): 1.6 g |

(Formation of Cholesteric Liquid Crystalline Layer)

The cholesteric liquid crystalline ink solution B prepared as described above was applied on a temporary support with a wire bar by using a polyethylene terephthalate (PET, COSMOSHINE A4100) film manufactured by Toyobo Co., Ltd. having a thickness of 100 μm as the temporary support. The applying was performed at room temperature by adjusting a thickness of a coated layer after the drying to be approximately 2 to 5 μm, and a coating was formed.

Next, the temporary support on which the coated layer was laminated, was left still on a hot plate at 100° C. for 1 minute and subjected to heating treatment.

Next, the UV irradiation was performed on the coated layer after the heating treatment for a certain period of time at room temperature under a nitrogen atmosphere (oxygen concentration of 500 ppm or less), and the coated layer was cured.

After that, the cured coated layer was cut to have a desired shape, and a cholesteric reflective layer 2 was formed. The formed cholesteric reflective layer 2 has a right-twisted cholesteric liquid crystalline phase and reflects right circularly polarized green light from the front.

Example 8

As Example 8, the same decorative film as in Example 3 was manufactured, except that the biaxial λ/4 plate shown below was provided, instead of the uniaxial λ/4 plate and the positive C-plate.

(Cellulose Acylate)

Cellulose acetate at a substitution degree of 2.81, a plasticizer (TPP: Triphenyl phosphate: 7.8% by mass, BDP: biphenyl diphenyl phosphate: 3.9% by mass), 7% by mass of a retardation developer (1) shown below, a retardation developer (2) shown below were put to the following mixed solvent, dichloromethane/methanol (87/13 parts by mass) while stirring so that a mass concentration of cotton becomes 15% by mass, and heated, stirred, and dissolved. In this case, at the same time, 0.05 parts by mass of a matting agent which is fine particles (AEROSIL 8972, manufactured by Nippon Aerosil Co., Ltd.) and 0.0009 parts by mass of the following dye (1) were put to 100 parts by mass of cellulose acylate and stirred while heating.

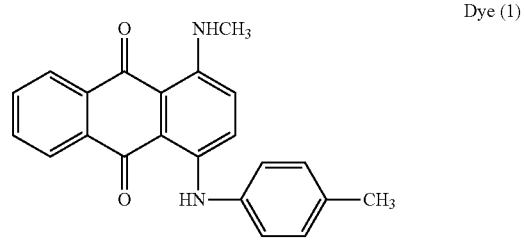

Dye (1)

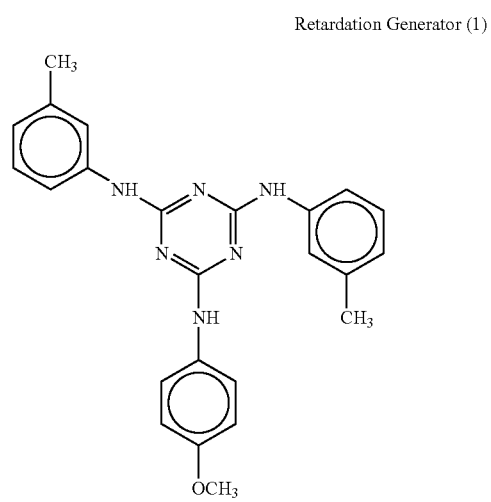

Retardation Generator (1)

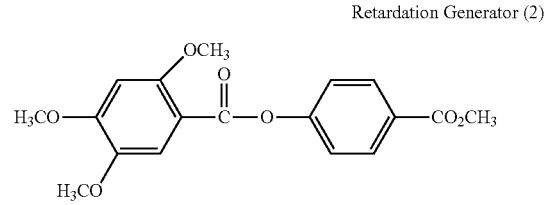

Retardation Generator (2)

(Casting)

The dope described above was cast by using a band casting machine. A film peeled off from the band with a residual solvent amount of 25 to 35% by mass was stretched in a vertical direction at a stretching ratio of 0.5%, stretched in a width direction at a stretching ratio of 32% using a tenter, contracted in a horizontal direction at a ratio of 70%, immediately after the cross-direction stretching, and the film was separated from the tenter, and the film was manufactured. Regarding the manufactured film, Re and Rth were measured and were respectively 140 nm and 350 nm, the Nz value (Rth/Re+0.5) was 3.0

Comparative Example 1

As Comparative Example 1, the same decorative film as that in Example 1 was manufactured, except that the positive C-plate was not provided.

<Evaluation>

Regarding the decorative films manufactured in the examples and the comparative examples, invisibility from the front, visual recognition angle, visibility, and visible color in an oblique direction were evaluated.

(Invisibility from the Front)

The decorative films manufactured in the examples and the comparative examples were observed from the front. A case where the film is observed in black without surface reflection was evaluated as A, a case where there is no surface reflection, but film underlayer showed through and was visually recognized was evaluated as B, and a case where the surface reflection occurs and film underlayer showed through and was visually recognized was evaluated as C.

(Visual Recognition Angle in Oblique Direction)

The decorative films manufactured in the examples and the comparative examples were observed in an oblique direction, and an angle at which color due to reflection of the circularly polarized light reflection layer could be visually recognized was measured. A direction vertical to the surface of the decorative film was set as 0 degree.

(Visibility in Oblique Direction)

The decorative films manufactured in the examples and the comparative examples were observed in an oblique direction. A case where the reflected light was clearly seen was evaluated as A, a case where the reflected light was seen but was slightly seen was set as B, and a case where the reflected light was substantially not seen was evaluated as C.

(Visible Color in Oblique Direction)

The decorative films manufactured in the examples and the comparative examples were observed in an oblique direction, and the color was evaluated.

The result is shown in Table 1. In Table 1, the positive C-plate was shown as +C-plate, and the negative C-plate was shown as −C-plate.

TABLE 1

|  |  | Comparative Example 1 | Example 1 | Example 2 | Example 3 | Example 4 |
|---|---|---|---|---|---|---|
| Layer configuration |  | None<br>Linear polarizer<br>λ/4<br>None<br>Cholesteric liquid crystalline layer 1<br>None<br>None<br>None | None<br>Linear polarizer<br>λ/4<br>+C-plate<br>Cholesteric liquid crystalline layer 1<br>None<br>None<br>None | Antireflection<br>Linear polarizer<br>λ/4<br>+C-plate<br>Cholesteric liquid crystalline layer 1<br>None<br>None<br>None | Antireflection<br>Linear polarizer<br>λ/4<br>+C-plate<br>Cholesteric liquid crystalline layer 1<br>None<br>None<br>Colored layer | Antireflection<br>Linear polarizer<br>+C-plate<br>λ/4<br>Cholesteric liquid crystalline layer 1<br>None<br>None<br>Colored layer |
| Evaluation | Invisibility from front | C | C | B | A | A |
|  | Visual recognition angle in oblique direction | — | 30 to 50 degrees | 30 to 50 degrees | 30 to 50 degrees | 30 to 50 degrees |
|  | Visibility in oblique direction | C | B | A | A | A |
|  | Visible color in oblique direction | — | Green | Green | Green | Green |

|  |  | Example 5 | Example 6 | Example 7 | Example 8 |
|---|---|---|---|---|---|
| Layer configuration |  | Antireflection<br>Linear polarizer<br>λ/4<br>−C-plate<br>Cholesteric liquid crystalline layer 1<br>None<br>None<br>Colored layer | Antireflection<br>Linear polarizer<br>−C-plate<br>λ/4<br>Cholesteric liquid crystalline layer 1<br>None<br>None<br>Colored layer | Antireflection<br>Linear polarizer<br>λ/4<br>+C-plate<br>Cholesteric liquid crystalline layer 1<br>−C-plate<br>Cholesteric liquid crystalline layer 2<br>Colored layer | Antireflection<br>Linear polarizer<br>Biaxial λ/4<br>Cholesteric liquid crystalline layer 1<br>None<br>None<br>Colored layer |
| Evaluation | Invisibility from front | A | A | A | A |
|  | Visual recognition angle in oblique direction | 30 to 50 degrees | 30 to 50 degrees | 30 to 50 degrees | 30 to 50 degrees |
|  | Visibility in oblique direction | A | A | A | A |
|  | Visible color in oblique direction | Green | Green | Green and blue | Green |

As shown from the results shown in Table 1, in the examples of the decorative films according to the embodiment of the present invention, the invisibility from the front was high and the visibility in an oblique direction was also high, compared to those in the comparative examples.

From the above results, the effect of the present invention is clear.

EXPLANATION OF REFERENCES 10a to 10f: decorative film
12: linear polarization plate
14: (uniaxial) λ/4 plate
16: C-plate
18: circularly polarized light reflection layer
20: colored layer
22: antireflection layer
24a: laminate of uniaxial retardation layer
24b: biaxial retardation layer
26: support
28: pressure sensitive adhesive layer
30: biaxial λ/4 plate
32rR: red right circular polarization reflection region
32rG: green right circular polarization reflection region
34: second circularly polarized light reflection layer

What is claimed is:

1. A decorative film comprising:
a circular polarization plate including a linear polarization plate, and a laminate of a uniaxial retardation layer or a biaxial retardation layer; and
a circularly polarized light reflection layer which reflects circularly polarized light having a revolution direction opposite to that of light transmitted through the circular polarization plate in a vertical direction from the linear polarization plate side,
a colored layer on a surface of the circularly polarized light reflection layer on a side opposite to the surface on the circular polarization plate side.

2. The decorative film according to claim 1,
wherein the laminate of the uniaxial retardation layer includes a uniaxial λ/4 plate and a C-plate.

3. The decorative film according to claim 2,
wherein a retardation absolute value of the C-plate in a thickness direction is 250 nm to 1,500 nm.

4. The decorative film according to claim 1,
wherein the biaxial retardation layer is formed of a biaxial λ/4 plate.

5. The decorative film according to claim 4,
wherein an Nz factor of the biaxial λ/4 plate is equal to or greater than 3.

6. The decorative film according to claim 1,
wherein the circularly polarized light reflection layer is a cholesteric liquid crystalline layer.

7. The decorative film according to claim 1,
wherein the circularly polarized light reflection layer includes two or more reflection regions having different selective reflection wavelengths.

8. The decorative film according to claim 1,
wherein a plurality of the circularly polarized light reflection layers are provided.

9. The decorative film according to claim 8, further comprising:
a C-plate between the plurality of circularly polarized light reflection layers.

10. The decorative film according to claim 1, further comprising:
a second circularly polarized light reflection layer on a side closer to an outermost surface on the linear polarization plate side than the laminate of the uniaxial retardation layer or the biaxial retardation layer.

11. The decorative film according to claim 10,
wherein the second circularly polarized light reflection layer includes two or more reflection regions having different selective reflection wavelengths.

12. The decorative film according to claim 1, further comprising:
an antireflection layer on an outermost surface layer on the linear polarization plate side.

* * * * *